United States Patent
Schäfer et al.

(10) Patent No.: US 12,343,838 B2
(45) Date of Patent: Jul. 1, 2025

(54) LOADING SYSTEM FOR AN OPTICAL MACHINE, IN PARTICULAR FOR LOADING AND UNLOADING OPTICAL WORKPIECES, SUCH AS EYEGLASS LENSES, AND DEBLOCKING APPARATUS COMPRISING A LOADING SYSTEM OF THIS TYPE

(71) Applicant: Satisloh AG, Baar (CH)

(72) Inventors: Holger Schäfer, Weilmünster (DE); Steffen Wallendorf, Wetzlar-Dutenhofen (DE); Martin Lautz, Wetzlar-Nauborn (DE); Gregor Pavel, Hüttenberg (DE)

(73) Assignee: Satisloh AG, Baar (CH)

( * ) Notice: Subject to any disclaimer, the term of this patent is extended or adjusted under 35 U.S.C. 154(b) by 16 days.

(21) Appl. No.: 17/761,117

(22) PCT Filed: Sep. 7, 2020

(86) PCT No.: PCT/EP2020/000150
§ 371 (c)(1),
(2) Date: Mar. 16, 2022

(87) PCT Pub. No.: WO2021/052614
PCT Pub. Date: Mar. 25, 2021

(65) Prior Publication Data
US 2024/0042563 A1 Feb. 8, 2024

(30) Foreign Application Priority Data
Sep. 16, 2019 (DE) ..................... 10 2019 006 503.4

(51) Int. Cl.
*B23Q 7/16* (2006.01)
*B23Q 7/04* (2006.01)
*B29D 11/00* (2006.01)

(52) U.S. Cl.
CPC ............... *B23Q 7/16* (2013.01); *B23Q 7/043* (2013.01); *B29D 11/00423* (2013.01)

(58) Field of Classification Search
CPC ............ B23Q 7/16; B23Q 7/043; B23Q 1/01; B24D 11/00423; B24B 13/0057; B24B 13/0031; B24B 27/0069; B29D 11/00423
See application file for complete search history.

(56) References Cited

U.S. PATENT DOCUMENTS

| 4,466,770 A | * | 8/1984 | Peroutky | ............... | B65G 47/902 |
| | | | | | 414/751.1 |
| 4,807,398 A | | 2/1989 | Ramos et al. | | |
| 5,002,448 A | * | 3/1991 | Kamijima | ............ | H05K 13/0411 |
| | | | | | 29/739 |

(Continued)

FOREIGN PATENT DOCUMENTS

| CN | 101249610 A | 8/2008 |
| CN | 102905996 A | 1/2013 |

(Continued)

OTHER PUBLICATIONS

Int. Search Report, Int. Application No. PCT/EP2020/000150, Int. Filing Date: Sep. 7, 2020, Applicant: Satisloh AG, Date: Dec. 22, 2020.

(Continued)

*Primary Examiner* — C. A. Rivera
(74) *Attorney, Agent, or Firm* — Reising Ethington P.C.

(57) ABSTRACT

The invention relates to a loading system (LS) for an optical machine, that has a carrier (TR), which can be moved in a movement plane (x-y) by way of two linear guide units (LF1, LF2). At least one holder (H1, H2, H3) for a workpiece, block piece and/or tool is mounted on the carrier, which holder can be moved in a transverse direction (z), which is perpendicular to the movement plane. The linear guide units are designed and arranged in the manner of an H gantry or cross gantry, with two stationary drive motors (AM1, AM2) for driving a tension element (ZG) in the same (Continued)

direction or in opposite directions, which tension element is movably arranged on the linear guide units in an H shape or cross shape and is fastened to the carrier.

19 Claims, 22 Drawing Sheets

(56) References Cited

U.S. PATENT DOCUMENTS

| | | | |
|---|---|---|---|
| 5,055,263 | A | 10/1991 | Meltzer |
| 10,583,540 | B2 | 3/2020 | Wallendorf et al. |
| 2020/0130126 | A1 | 4/2020 | Schneider et al. |

FOREIGN PATENT DOCUMENTS

| | | | | | |
|---|---|---|---|---|---|
| CN | 109551024 | A | | 4/2019 | |
| CN | 109693177 | A | | 4/2019 | |
| DE | 102017003014 | A1 | | 10/2018 | |
| GB | 2274719 | A | * | 8/1994 | ............. B23Q 1/621 |
| KR | 1998-053897 | U | * | 10/1998 | ............... B23Q 7/04 |
| WO | 9637346 | A1 | | 11/1996 | |

OTHER PUBLICATIONS

German Office Action, Serial No. 102019006503.4, Applicant: Satisloh AG, Date: Oct. 18, 2021.

PCT International Preliminary Report on Patentability, Int. Application No. PCT/EP2020/000150, Int. Filing Date: Sep. 7, 2020, Applicant: Satisloh AG, Date: Mar. 31, 2022.

China 1st Office Action with English translation, Application No. 202080065148.7, Applicant: Satisloh AG, Title: Loading System for an Optical Machine, in Particular for Loading and Unloading Optical Workpieces, such as Eyeglass Lenses, and Deblocking Device Comprising a Loading System of this Type, Dated: May 27, 2023.

* cited by examiner

LOADING SYSTEM FOR AN OPTICAL MACHINE, IN PARTICULAR FOR LOADING AND UNLOADING OPTICAL WORKPIECES, SUCH AS EYEGLASS LENSES, AND DEBLOCKING APPARATUS COMPRISING A LOADING SYSTEM OF THIS TYPE

TECHNICAL FIELD

The present invention relates generally to a loading system for an optical machine. In particular, the invention relates to a loading system for loading and unloading optical workpieces, such as spectacle lenses, such as are widely employed in modern "RX workshops", i.e. industrial production facilities for production of individual spectacle lenses according to prescription. If in the following there is also discussion of, in particular, loading or unloading workpieces, then the loading system is also equally suitable for change of, for example, tools, which accordingly is to be regarded as included.

The invention preferably relates to an apparatus for deblocking optical workpieces, particularly spectacle lenses, from associated block pieces, which comprises such a loading system in order to handle blocked workpieces prior to the deblocking and block pieces and deblocked workpieces after the deblocking.

STATE OF THE ART

In optical production, "blocking-on" or, for short, "blocking" generally denotes the procedure in which an optical workpiece is temporarily fastened with the aid of a suitable material (alloyed material of low melting point—so-called "alloy"—or adhesive) on a so-called "block piece" or, however, the blocking material is coated on the workpiece so as to itself form the block piece, which then serves the purpose of holding the workpiece in the respective processing machine and/or coating system. Accordingly, in optical production that process in which the optical workpiece after (final) processing thereof (at surface and/or edge) and/or coating thereof is again separated from the block piece/blocking material is called "deblocking".

Spectacle lenses are blocked on a large scale in the afore-mentioned RX workshops before each blocked spectacle lens is then processed by material removal with geometrically defined cutting (milling/turning) or geometrically undefined cutting (grinding/polishing) at its back surface or front surface with respect to its optical effect and/or at the edge for fitting in an associated spectacle frame and/or is coated on its back surface or front surface for achieving additional effects (increase in scratch resistance, anti-reflection properties, vapor deposition, hydrophobic properties, etc.).

When in the following in connection with the present invention mention is made in general of "spectacle lenses" as preferred field of use there are to be understood by that optical lenses or lens preforms (blanks) for spectacles of customary materials such as polycarbonate, mineral glass, CR 39, HI-index, etc., which may have any desired (preliminary) shape of the circumferential edge of the lens or lens blank and which prior to blocking may—but do not have to—have already undergone (preliminary) processing and/or (preliminary) coating at one optically effective surface or both optically effective surfaces and/or at the edge. In addition, the spectacle lens can be provided on its surface, at which it is or is to be blocked, with a film, a lacquer or the like so as to protect this surface from contamination and damage and/or to improve the adhesion characteristics between spectacle lens and blocking material.

There is no lack of proposals in the prior art as to how in industrial production of spectacle lenses the workpieces can be automatically loaded into an optical machine for processing or further treatment and removed again from the optical machine after the processing or further treatment. Thus, document DE 10 2014 015 053 A1 (FIG. 1) discloses a polishing machine for polishing spectacle lenses, comprising a plurality of polishing cells which are arranged adjacent to one another in a common machine frame. The machine frame additionally carries a washing station for washing the polished spectacle lenses and a transfer station for deposit of so-called "job trays" customary in spectacle lens production. The trays serve for reception of spectacle lenses which are to be polished and have been polished and can be moved forwards and backwards in the polishing machine by a conveyor belt of the transfer station.

As loading system, the prior art polishing machine further comprises a gantry handling system by which the spectacle lenses can be automatically transported between the afore-mentioned stations and polishing cells and positioned in the respective station or polishing cell. For that purpose the gantry handling system has a three-dimensionally movable sucker unit for holding a spectacle lens, which is to be polished, at the optically effective surface to be polished as well as a three-dimensionally movable multi-finger gripper for holding a polished spectacle lens at the edge thereof. The discussed possibilities of three-dimensional movement comprise horizontal (x, y) and vertical (z) linear movements as well as a tilting movement (b) about a transverse axis parallel to a horizontal movement direction (y).

More precisely, the gantry handling system has two x linear units with drive arrangement for producing the x movement, which are arranged at the polishing machine at the top on either side of the machine frame. The x carriages of the x linear units each carry a pivot mount, which with the assistance of a pneumatic cylinder enables tilting of a y linear unit, which is mounted on the pivot mounts and forms the "gantry", with drive arrangement for producing the y movement through a predetermined angle. By virtue of this measure a z linear unit mounted on a y carriage of the y linear unit can be tilted out of the vertical so as to be adapted to a workpiece spindle inclined setting which arises in the state of the polishing cells being mounted in the machine frame. Finally, the sucker unit and the multi-finger gripper are mounted on the z linear unit to be longitudinally displaceable and, in particular, in such a way that they can be moved in opposite sense by a common drive, i.e. if the sucker unit is moved downwardly the multi-finger gripper moves upwardly at the same time, and conversely.

A spectacle lens to be polished can thus be lifted (z) by the sucker unit of the gantry handling system out of a job tray on the transfer station by movement of the z linear unit, then moved three-dimensionally (b, x, y) and adjusted (z) to an inclined workpiece spindle of the desired polishing cell for processing by polishing. After the processing by polishing, the spectacle lens polished to finished state can be lifted (z) by the multi-finger gripper out of the respective polishing cell, transported (b, x, y) to the washing station and inserted (z) into this so as to remove polishing medium residues by washing. The clean spectacle lens can subsequently be lifted (z) by the multi-finger gripper out of the washing station, moved (x, y) to the respective job tray on the transfer station and deposited (z) therein. The spectacle lenses can accordingly be transported back and forth by the gantry handling system as desired or necessary between the polishing cells and stations.

Document DE 10 2017 001 679 A1, discloses a prior art loading system for the case of a deblocking apparatus. The loading system, which in the terminology of this specification is termed "manipulation device" and which is attached to a frame of the deblocking apparatus above a work space, comprises three grippers which can be telescoped independently of one another in vertical direction (z). The grippers serve the purpose of gripping, picking up, conveying and depositing the blocked lens, thus the lens together with the associated block piece, the deblocked lens and the deblocking block piece independently of one another and, in particular, at or between transport carriers on a conveying device and holding devices, which are spaced therefrom, for lens and block piece at a work space in which the deblocking takes place.

In that case the grippers together with their associated setting devices (pneumatic cylinder for the Z direction) are mounted on a carrier which can be moved in a horizontal plane (X-Y plane). For that purpose the carrier is mounted on a first linear guide (Y direction), which in turn is mounted together with its drive on a second linear guide (X direction) mounted on the frame. The supply of energy to the setting devices and linear guides takes place by way of cable trailing systems. However, this and the weight of the linear guides arranged one on the other together with associated drives limit the dynamics of this prior art loading system.

What is desired is to provide a loading system for an optical machine, particularly for loading and unloading optical workpieces, such as spectacle lenses, and/or block pieces for blocking optical workpieces and/or tools, which is constructed as simply and compactly as possible and enables loading and unloading with highest possible dynamics. What is also desired is an apparatus for deblocking optical workpieces, particularly spectacle lenses, from associated block pieces, which for the purpose of achieving a highest possible throughput in an industrial production environment comprises such a loading system.

SUMMARY OF THE INVENTION

One aspect of the invention is directed to a loading system for an optical machine. Another aspect of the invention is directed to an apparatus for deblocking optical workpieces, namely spectacle lenses, from associated block pieces.

According to one aspect of the invention, in a loading system for an optical machine, particularly for loading and unloading optical workpieces, such as spectacle lenses, and/or block pieces for the blocking of optical workpieces and/or tools, comprises a carrier which is movable in a movement plane by way of two linear guide units and which carries at least one holder for the optical workpiece and/or the block piece and/or the tool, the carrier being movable in a transverse direction with respect to the movement plane. The linear guide units are constructed and arranged in the form of an H gantry or a cross gantry, with two stationary drive motors for drive in the same or opposite sense of a traction element which is movably arranged in an H shape or a cross shape at the linear guide units and is secured to the carrier.

According to another aspect of the invention, an apparatus for deblocking optical workpieces, particularly spectacle lenses, from associated block pieces, comprises a transfer station for the deposit of optical workpieces, which are blocked on block pieces, and/or deblocked optical workpieces and/or block pieces, a loading station for loading optical workpieces, which are blocked on block pieces, prior to the deblocking and/or unloading deblocked optical workpieces and/or block pieces after the deblocking, and the above loading system by which the optical workpieces blocked on block pieces and/or the deblocked optical workpieces and/or the block pieces are transportable between the transfer station and the loading station and can be placed in or removed from the respective station.

Due to the fact that, in accordance with the invention, the two drive motors for drive of the traction element in the same sense or opposite sense are arranged in stationary location, i.e. in distinction from the drive motors in the afore-described prior art are not moved together with the movable carrier or a linear guide unit and also do not have to be supplied by way of associated cable trailing systems, according to the present invention in conjunction with a comparatively low outlay on a device technology and an advantageously flat system mode of construction there is only a small moved intrinsic mass of the loading system. This makes possible high accelerations of the movable carrier in the two axial directions of the movement plane, so that the parts (optical workpieces, block pieces or tools) held at the transversely movable holder of the carrier can be moved with a very high dynamic.

In that regard, the linear guide units of the loading system according to one aspect of the invention are constructed and arranged in the form of an H gantry—as will be described in more detail in the following—or, however, in the form of an X gantry or a cross gantry. Since merely the H gantry will be explained in more detail later with respect to the embodiment, the cross gantry shall be briefly described at this point: In the case of a cross gantry the linear guide units comprise two cross members, namely a stationary first cross member, which, for example, is mounted on a machine frame of the optical machine and on which a carriage is guided to be movable in, for example, a y direction, and a movable second cross member, which crosses—giving the name—the first cross member and which is arranged on the aforementioned carriage to be movable in a transverse direction, that is to say, for example, an x direction. The carrier, on which the holder is mounted to be movable in a further transverse direction, i.e. here a z direction, is then mounted on the second cross member at the end. As seen in plan view, i.e. towards the z direction, the result is thus a cross with a horizontal orientation of the stationary first cross member (y direction to the right) and vertical orientation of the longitudinally displaceable second cross member (x direction downwardly).

Provided for movement of the carrier in the movement plane x-y of the cross gantry is the traction element, which is movably arranged in cross shape at the linear guide units and secured to the carrier. More precisely, the traction element is guided over four 90° deflection rollers at the carriage, two 180° deflection rollers at the ends of the stationary first cross member and a 180° deflection roller at the free end, which is remote from the carrier, of the movable second cross member. The drive of the traction element can take place by way of the two 180° deflection rollers at the ends of the stationary first cross member, which are each drivingly connected with a respective one of the two stationary drive motors.

As seen in the afore-described plan view the following movements of the carrier in the movement plane x-y of the cross gantry can be generated: If the two 180° deflection rollers are driven at the same speed and with a positive direction of rotation (i.e. in clockwise sense), then the carrier mounted at the end of the second cross member moves in negative y direction. If the drive of the two 180° deflection rollers takes place at the same speed and in negative direction of rotation (i.e. in anticlockwise sense), then the carrier moves in positive y direction. A movement of the carrier in positive x direction arises when the 180° deflection roller, which is on the right as seen in plan view, is driven in positive direction of rotation and the 180° deflection roller, which is on the left as seen in plan view, is driven in negative direction of rotation at the same speed. In the case of reversal of direction of rotation of the two 180° deflection rollers, the carrier is moved in negative x direction.

If only the 180° deflection roller on the left as seen in plan view is driven in positive direction of rotation, while the 180° deflection roller on the right is stationary, then the carriage moves on the stationary first cross member in negative y direction, while the movable second cross member is displaced in negative x direction, so that the carrier moves diagonally in negative y direction and negative x direction. This can reverse through a reversal of rotational direction at the 180° deflection roller on the left, so that the carrier moves diagonally in positive y direction and positive x direction. Analogously thereto, when the 180° deflection roller on the left is stationary a diagonal movement of the carrier in negative y direction and positive x direction or in positive y direction and negative x direction can be produced by the 180° deflection roller on the right being driven in clockwise sense or in anticlockwise sense. Moreover, any desired path in the movement plane x-y of the cross gantry can be travelled by the carrier through suitable superimposition of the drive motions.

It will be apparent to the one ordinarily skilled in the art that in this way the carrier can move to any desired position in the movement plane x-y through suitable activation of the stationary drive motors. This applies equally to the cross arrangement and the H arrangement of the linear guide units, wherein, however, the H arrangement by comparison with the cross arrangement promises a higher degree of stiffness with less need for installation space and to that extent can be regarded as a preferred arrangement.

By comparison with the prior art outlined in the introduction, the loading system in an embodiment according to the invention makes possible, particularly in a case of use at a device for deblocking optical workpieces, namely spectacle lenses, from associated block pieces a substantial increase in throughput of optical workpieces as a consequence of its high dynamic. This high level of throughput performance makes the loading system according to the invention suitable for use in an industrial production environment in which a very high number of optical workpieces for treatment or processing arises.

In a preferred embodiment of the loading system one linear guide unit comprises two stationary x guide elements which extend parallel to one another and at each of which a respective x half-carriage is guided to be longitudinally displaceable, while the other linear guide unit comprises two y guide elements which extend parallel to one another and transversely to the x guide elements and rigidly connect the x half-carriages together and at which the carrier as y carriage is guided to be longitudinally displaceable. In principle, it is in fact also conceivable to provide other guide element arrangements, for example a stationary x guide element with a y guide element, which is displaceable thereon by way of an x carriage, for the carrier as y carriage in a T arrangement as a special case of the above-described cross gantry, as also a stationary x guide element on which two y guide elements for the carrier as y carriage are movably arranged by way of an x carriage, or two stationary x guide elements on which a y guide element for the carrier as y carriage is displaceably arranged in H shape by way of two x half-carriages, wherein the directions x and y can also be interchanged. However, these alternative guide element arrangements with individual guide elements in one direction (x and/or y) would have to be of appropriately solid construction in order to be able to accept torsional moments. By contrast, the first-mentioned embodiment of the loading system, in which two y guide elements are a component of a divided x carriage, is preferred particularly with respect to a high level of stiffness with a compact form of construction.

In the case of such linear guide units constructed and arranged in the manner of an H gantry, provision can be made in an expedient embodiment of the loading system that two 180° deflections for the traction element are associated with each of the stationary x guide elements and arranged at the end, whereas each of the x half-carriages carries two 90° deflections for the traction element, wherein one of the 180° deflections is drivable at one x guide element by one of the stationary drive motors and independently thereof the other one of the 180° deflections is drivable at the other x guide element by the other one of the stationary drive motors. In that regard, the stationary drive motors can be arranged at the x guide elements in a particularly service-friendly manner on the same side of the x guide elements or at opposite ends of the x guide elements, i.e. diagonally offset.

It is further preferred particularly with respect to reliable and low-wear functioning of the loading system if one of the 180° deflections for the traction element is provided with a tensioning device for the traction element. In principle, tensioning of the traction element can indeed also take place at the carrier or one of the 90° deflections, but such an embodiment is less preferred insofar as the tensioning device would then increase the moved mass of the loading system. By comparison with an equally conceivable, stationary tensioning roller or the like for the traction element the tensioning device at one of the 180° deflections additionally offers the advantage that even with a small setting travel of the tensioning device a large tensioning effect can be achieved, because there is tensioning at two runs of the traction element at the same time in the same direction.

Fundamentally, for example, linear guides with a guide profile and guide carriages engaging therewith can be used for guidance of the x carriage or y carriage of the loading system. However, on the other hand it is preferred if the x guide elements and/or the y guide elements are guide rods which as a consequence of the possible guidance at the circumference or wrapping ensure particularly rigid guidance even in the case of rapid movements. In particular, the x guide elements and/or the y guide elements can be guide rods with a round cross-section, which by comparison with other equally possible cross-sectional shapes offers special advantages with respect to possibilities of cleaning and smooth running as well as promises high load ratings. In that regard, it can also be provided that, in particular, the y guide elements are constructed as hollow bodies. By comparison with an equally conceivable solid configuration of the y guide elements, above all weight advantages—which in turn also favor a high dynamic—are offered by y guide elements formed as hollow bodies. Finally, a further advantage of the rod guides preferred here is that the x carriage can be constructed as a light self-supporting unit from the two x half-carriages and the rod-shaped y guide elements without further load-bearing components being needed.

In a further preferred embodiment of the loading system each of the x half-carriages is provided with two axially mutually spaced-apart linear bearing elements which co-operate with the respective guide rod associated as x guide element. This is primarily of advantage with respect to the stability of the arrangement by comparison with an also possible construction with a respective longer linear bearing element per x half-carriage. Equally, the carrier constructed as y carriage can preferably comprise three mutually spaced-apart linear bearing elements, of which two linear bearing elements co-operate with one y guide element constructed as a guide rod, whilst the other linear bearing element co-operates with the other y guide element constructed as a guide rod. Conceivable as a possible alternative to this statically defined bearing arrangement would be a bearing arrangement with two linear bearing elements associated individually or four linear bearing elements associated in pairs with the two y guide elements at the carrier, which, however, would be less stiff or heavier than the above preferred embodiment.

In the case of the above statically defined bearing arrangement at the y carriage it is additionally of advantage if in a preferred embodiment of the loading system the traction element is fastened near the two linear bearing elements, which both co-operate with the one y guide element constructed as a guide rod, to a fastening point provided at the carrier. Thus, tilting moments, which may detract from smooth running of the bearing arrangement, at the carrier are avoided in simple manner. The individual linear bearing element remote from the fastening point for the traction element in that regard bears merely a part of the weight of the carrier on the associated y guide element and supports the carrier against twisting with respect to the other y guide element.

In principle, all linearly guiding easy-motion bearings are conceivable as linear bearing elements, for example linear slide bearings or linear ball bearings with a ball cage. However, with respect to good serviceability and low costs it is preferred if the linear bearing elements are ball bushings. Strippers can be respectively associated therewith at both longitudinal sides for smooth running which is as permanent as possible.

Various alternatives are also conceivable for the traction element, thus, for example, a cable with loopings at the drive for transmission of the drive moment or a chain, such as link chain or a ball chain. However, with respect to a satisfactory capability of force transmission, ease of maintenance and a high degree of longitudinal stability it is preferred if the traction element is a belt, namely a cogged belt. In the case of a cogged belt, which has no slip and a fixed pitch, measuring systems for the travel paths of the carrier or the holder or holders may even be superfluous for positioning tasks of the loading system.

Moreover, the at least one or each holder is preferably movable by an associated pneumatic cylinder in the transverse direction with respect to the movement plane. Other actuators for producing a linear movement are also conceivable as an alternative thereto, for example an electric drive or a hydraulic cylinder, which, however, is less preferred particularly from the aspect of lowest possible costs.

Furthermore, in a preferred embodiment of the loading system it can be provided that the at least one or each holder is pivotable by an associated pneumatic pivot mechanism from a position aligned with the transverse direction to a position oriented substantially perpendicularly to the transverse direction, and conversely. Here, as well, it is possible to use—instead of pneumatic generation of movement—other principles of generation, for example electric or hydraulic, although less preferred, especially since compressed air is usually present in any case at an optical machine. The thus-given possibility of pivotation of the holder or holders advantageously increases the flexibility of the loading system, because the holder or holders can be three-dimensionally moved not only in the sense of a simple "pick & place" system, but also tilted for different insertion or removal tasks at the optical machine, for example from a vertical orientation to a horizontal orientation or conversely.

The at least one or each holder is preferably a pneumatically actuable multi-finger gripper, which advantageously is capable of gripping optical workpieces with any circumferential contour without coming into contact with the usually sensitive front surface or back surface of the workpiece at the time of gripping or during holding, in distinction from, for example, a vacuum suction head or cup equally conceivable as a holder. The above statements correspondingly apply here with respect to alternative principles of generation of movement for the gripper fingers (for example, electric or hydraulic).

In further pursuance of the concept of the invention the arrangement can be such that a valve terminal for activation of the pneumatic cylinder or the pneumatic cylinders and/or of the pneumatic pivot mechanism or the pneumatic mechanisms and/or the pneumatically actuable multi-finger gripper or the pneumatic actuable multi-finger grippers is arranged on the carrier constructed as y carriage. It is thus merely necessary to lead a common supply line to the valve terminal, which is moved together with the carrier and from where further pneumatic subdivision takes place. A more substantial trailing system, which may hinder or even prevent highly dynamic movements of the carrier, for the supply is thus advantageously avoided.

In a preferred embodiment of the loading system it is provided, particularly with respect to a largest possible stiffness and stability with low weight, that the carrier as seen in plan view is of substantially O-shaped construction with a central opening in which the at least one holder is mounted to be movable in the transverse direction with respect to the movement plane.

In a possible use of the loading system according to the invention in a deblocking apparatus for deblocking optical workpieces, namely spectacle lenses, from associated block pieces it is particularly advantageous if the carrier of the loading system carries three holders which are movable in the transverse direction with respect to the movement plane and of which a first holder is assigned to the optical workpieces blocked on block pieces, a second holder is assigned to the deblocked optical workpieces and a third holder is assigned to the block pieces. A parallelization, to the greatest possible extent, of the loading and unloading processes during deblocking is thus possible, in which, in particular, the carrier of the loading system has to be moved only a small amount at the respective station (transfer station or loading station) of the deblocking apparatus, which is conducive to a high dynamic and a large throughput of optical workpieces.

In that case, the transfer station of the deblocking apparatus preferably has a conveyor belt for transport of job trays in a transport direction, wherein the job trays serve for reception of optical workpieces blocked on block pieces and/or deblocked optical workpieces and/or block pieces. However, it is also possible to operate without job trays and conveyor belt, for example with different workpiece carriers or block piece carriers for carrying individual optical workpieces in the blocked or deblocked state and/or different conveying device such as, for example, a chain or carousel conveying device or with a mere deposit possibility for the optical workpieces and/or the block pieces.

Finally, in the case of an embodiment of the deblocking apparatus with conveyor belt and job trays it can be provided that the second holder for the deblocked optical workpieces as seen transversely to the transport direction of the conveyor belt lies adjacent to the third holder for the block pieces. This is also advantageously helpful with respect to parallelization of the loading and unloading processes-particularly without the necessity of conveyor belt movement—and thus with respect to a large throughput of optical workpieces.

BRIEF DESCRIPTION OF THE DRAWINGS

The invention is explained in more detail in the following on the basis of a preferred embodiment with reference to the accompanying partly simplified or schematic drawings, which are not to scale and in which.

Figure 1:
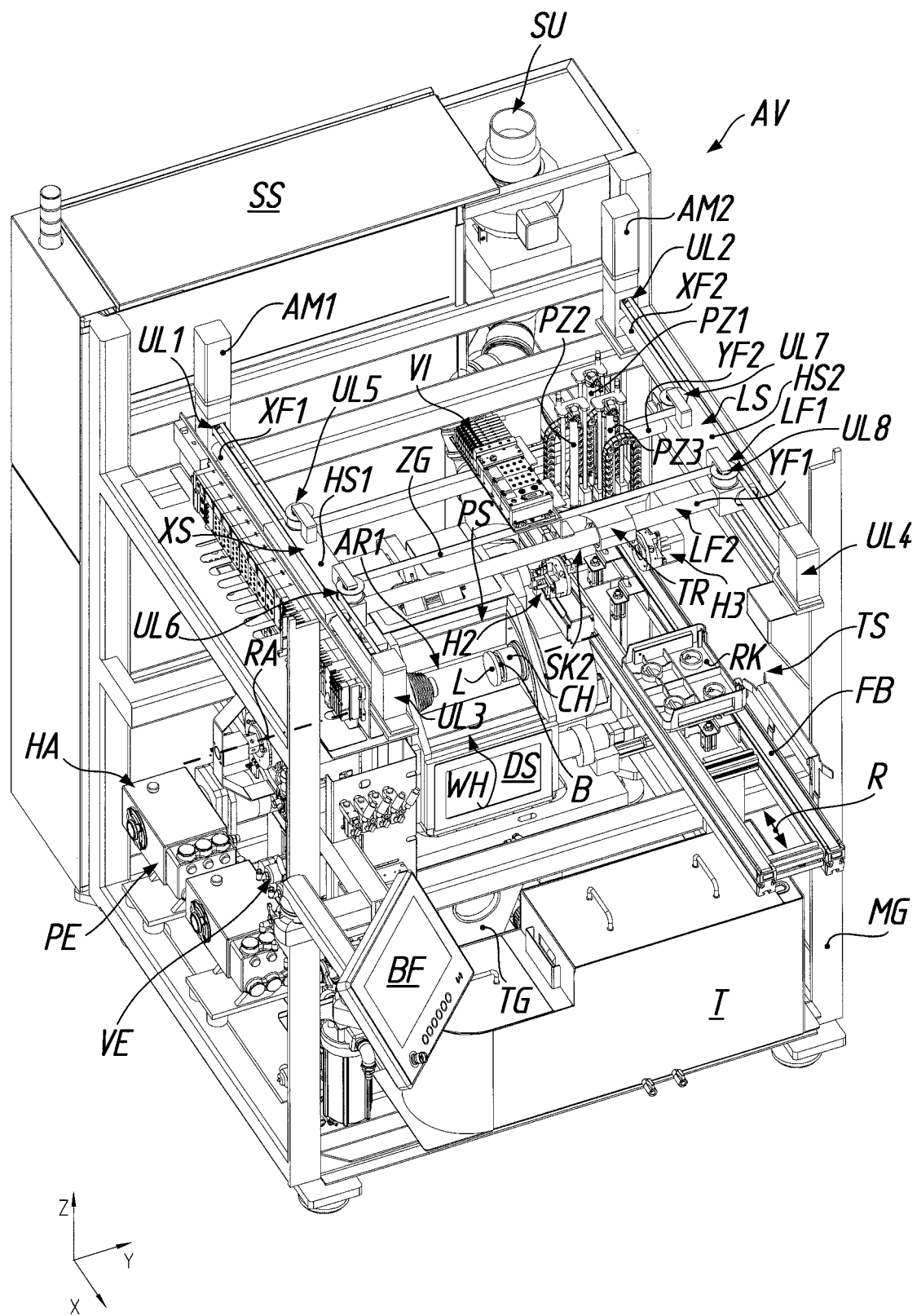
FIG. 1 shows a perspective view of a deblocking apparatus for deblocking optical workpieces, namely spectacle lenses, from associated block pieces from obliquely above and front left, with a loading system according to the invention in an upper region, by which the spectacle lenses blocked on block pieces or the deblocked spectacle lenses and block pieces can be transported between a transfer station and a loading station of the deblocking apparatus and placed in or removed from the respective station.

With respect to the drawings it may also be noted at this point that the illustration of the deblocking apparatus with the loading system according to the invention is in a right-angled Cartesian co-ordinate system in which the letter x denotes the length direction, the letter y denotes the width direction and the letter z denotes the height direction of the deblocking apparatus or loading system. In order to reveal a view of essential components or subassemblies of the deblocking apparatus and the loading system and for simplification of the illustration, parts of the cladding, the supply devices (inclusive of lines, hoses and pipes) for power, compressed air and water as pressure medium, the suction device as well as the measuring, maintenance and safety devices, in particular, have mostly been omitted in the drawings, since they do not appear necessary for an understanding of the invention and are in any case familiar to the expert.

DETAILED DESCRIPTION OF THE EMBODIMENT

A deblocking apparatus, for example for an optical machine for treatment and/or processing optical workpieces, for the deblocking of optical workpieces, such as spectacle lenses L, from associated block pieces B is generally denoted by the reference AV in FIGS. 1 to 3 and 14 to 35. The deblocking apparatus AV comprises a machine frame MG, on which, as core element of the deblocking apparatus AV, a specially constructed workpiece holding arrangement WH is movably mounted at a central point, the arrangement being further described in the following to the extent appearing desirable for a better understanding of the present invention.

The basic construction of the deblocking apparatus AV and, in particular, of the workpiece holding arrangement WH is the subject of parallel German Patent Application DE 10 2019 006 504.2 (called parallel application in the following), i.e. filed with the same application date, under the title "Optical machine for treatment and/or processing optical workpieces, such as spectacle lenses, as well as deblocking apparatus and deblocking method therefor", to which at this point for avoidance of repetition express reference may be made with respect to the more precise structure and function of the deblocking apparatus AV in general and the workpiece holding arrangement WH specifically.

As can be best recognized in FIGS. 14 to 35, different stations of the deblocking apparatus AV are grouped in stationary position at the machine frame MG around the workpiece holding arrangement WH. The stations are, firstly, a loading station PS at the top (see, in particular, FIGS. 14, 15 and 20 to 35), comprising a first sub-station PS1 (top front) for loading spectacle lenses L, which are blocked on block pieces B, prior to the deblocking and for unloading block pieces B after the deblocking, as well as a second sub-station PS2 (top rear) for unloading deblocked spectacle lenses L after the deblocking. Mounted on the machine frame MG at a three-dimensional spacing from the loading station PS are, below the loading station PS, a deblocking station DS (bottom front; cf., for example, FIGS. 1 and 2) as first treatment station for deblocking spectacle lenses L from the respectively associated block piece B and a cleaning station CS (bottom rear; see, in particular, FIGS. 16 to 19) as a further treatment station for cleaning the deblocked spectacle lenses L and the block pieces B.

The deblocking station DS comprises—as shown in the afore-mentioned German parallel application, but not here—as a first treatment device a first nozzle subassembly with a first high-pressure nozzle for delivery of a high-pressure pressure medium jet for deblocking the spectacle lenses L from the respectively associated block piece B. The cleaning station CS comprises—again not illustrated here, but shown in the afore-mentioned German parallel application—as a second treatment device a second nozzle subassembly with a second high-pressure nozzle for delivery of a high-pressure pressure medium jet for cleaning the deblocked spectacle lenses L and, as a third treatment device, a third nozzle subassembly with a third high-pressure nozzle for delivery of a high-pressure medium jet for cleaning the block pieces B.

Figure 2:
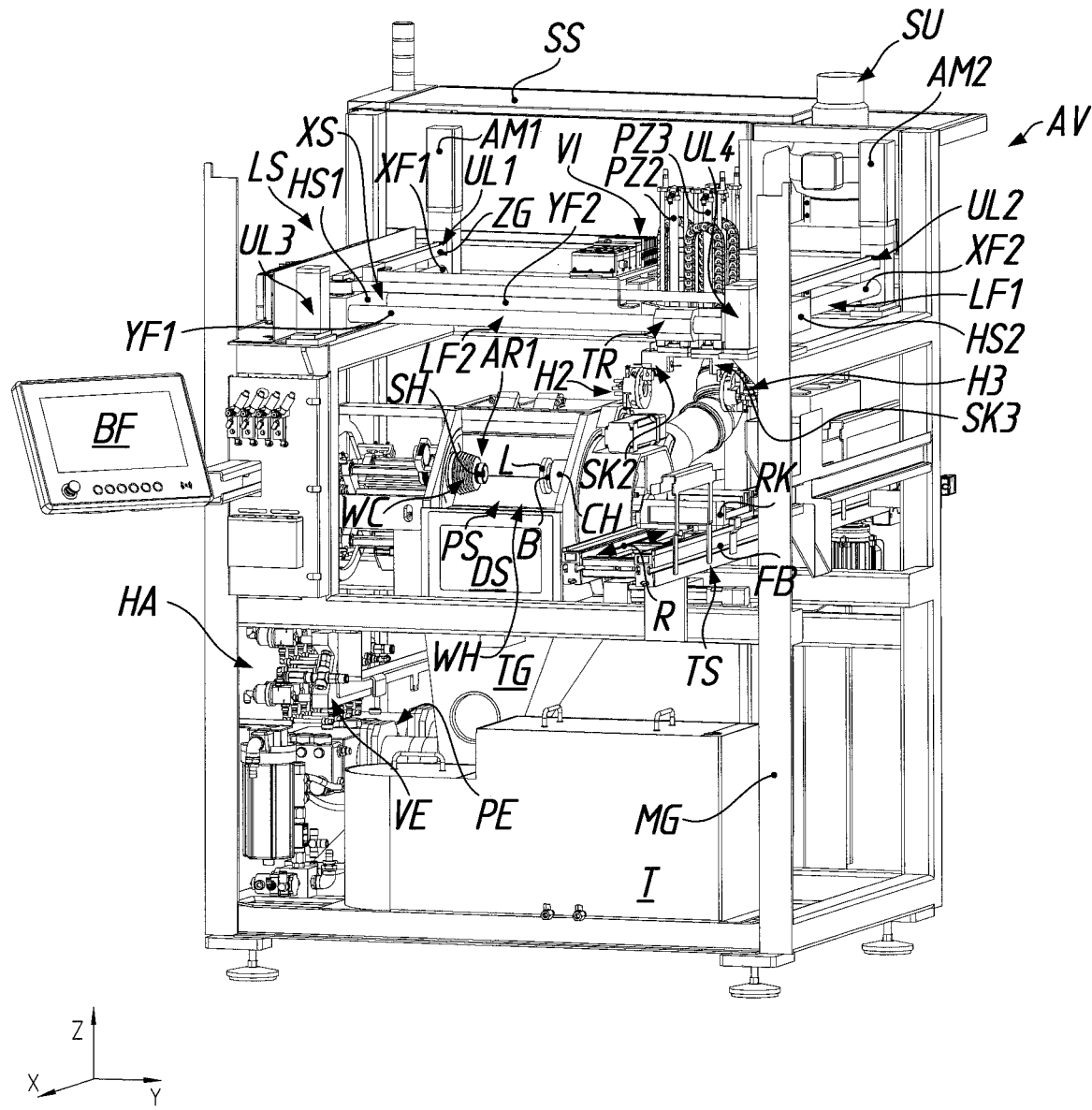
FIG. 2 shows a perspective view of the deblocking apparatus according to FIG. 1 from obliquely above and front right.

The hydraulic supply of the afore-mentioned nozzle subassemblies is carried out by way of a hydraulic arrangement HA, which according to FIGS. 1 and 2 is mounted on the machine frame MG in a lower region, laterally below the workpiece holding arrangement WH. This hydraulic arrangement HA generally comprises a pump unit PE, by which temperature-controlled water as pressure medium can be conveyed from a tank T by way of a distributor device VE of the hydraulic arrangement HA to the nozzle subassemblies. In addition, low-pressure nozzles—again not shown here, but illustrated in the afore-mentioned German parallel application—are connected with the hydraulic arrangement and serve for cleaning the deblocking station DS and the cleaning station CS.

This hydraulic arrangement HA is the subject of parallel U.S. Patent Application based on PCT/EP2020/000149 with priority German Patent Application DE 10 2019 006 505.0, i.e. filed on the same application date, under the title "Hydraulic arrangement for an apparatus for deblocking optical workpieces, particularly spectacle lenses, from associated block pieces", to which, for the avoidance of repetition, express reference may be made at this point with respect to the more precise construction and function of the hydraulic arrangement HA. U.S. Patent Application based on PCT/EP2020/000149 is hereby incorporated by reference.

Arranged at approximately the same height as the workpiece holding arrangement WH and on the right in FIGS. 1 and 2 adjacent to the workpiece holding arrangement WH is a transfer station TS for deposit of spectacle lenses L blocked on block pieces B, deblocked spectacle lenses L and block pieces B. In the illustrated embodiment the transfer station TS of the deblocking apparatus AV comprises a conveyor belt FB, which is mounted on the machine frame MG, for transport of job trays RK in a transport direction R. The job trays RK serve for reception of spectacle lenses L blocked on block pieces B, deblocked spectacle lenses L and block pieces B.

Mounted above the workpiece holding arrangement WH and the transfer station TS at the machine frame MG is a loading system LS, which is described in more detail in the following and by which the spectacle lenses L blocked on block pieces B, deblocked spectacle lenses L and deblocked block pieces B can be transported between the transfer station TS and the loading station PS, which is provided at the workpiece holding arrangement WH, with its sub-stations PS1, PS2 and placed in and removed from the respective station TS, PS1, PS2.

Figure 4:
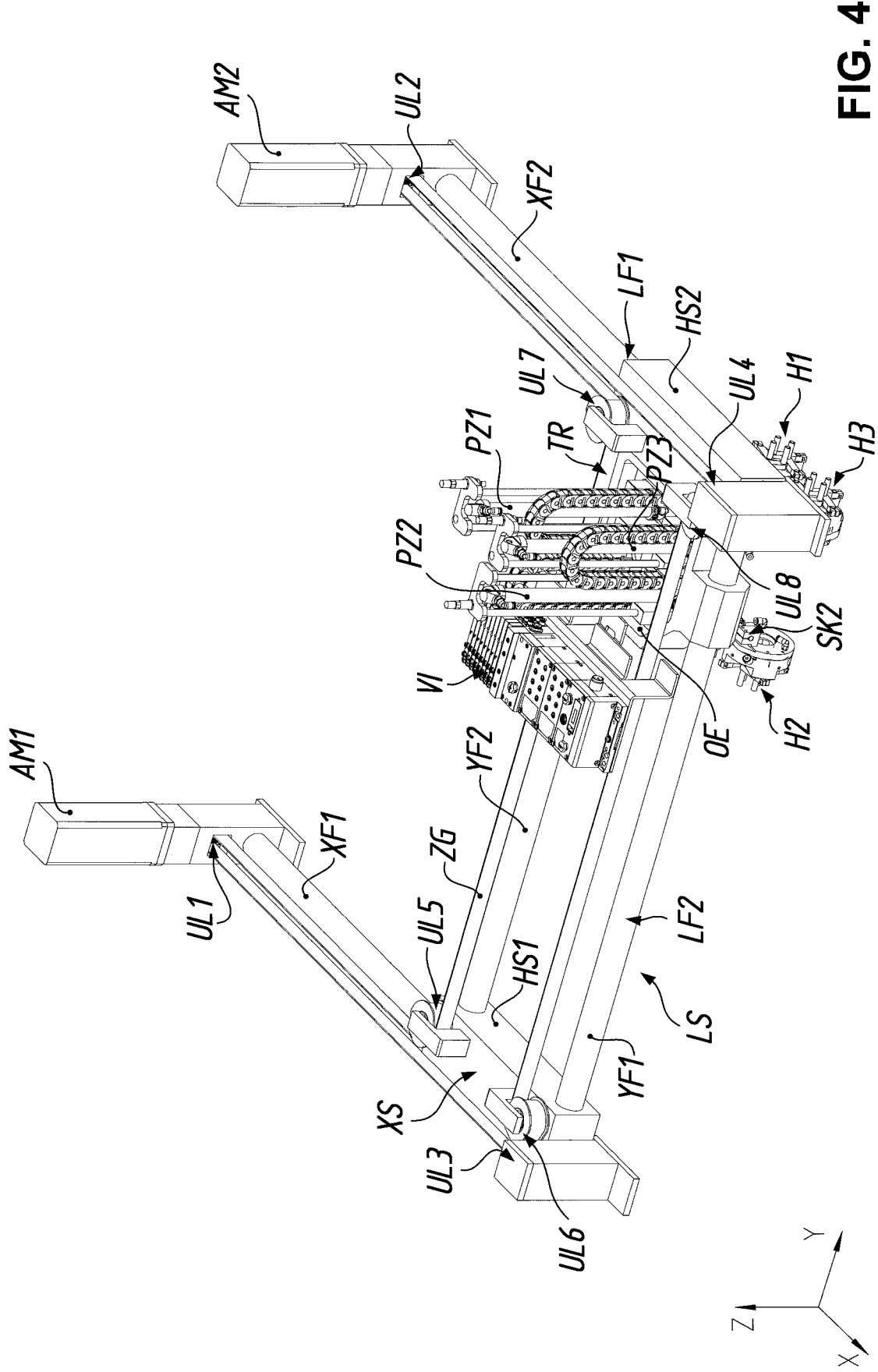
FIG. 4 shows a perspective view of the loading system—which is separated from the deblocking apparatus according to FIG. 1—of the deblocking apparatus from obliquely above and front right.
Figures 5, 6:
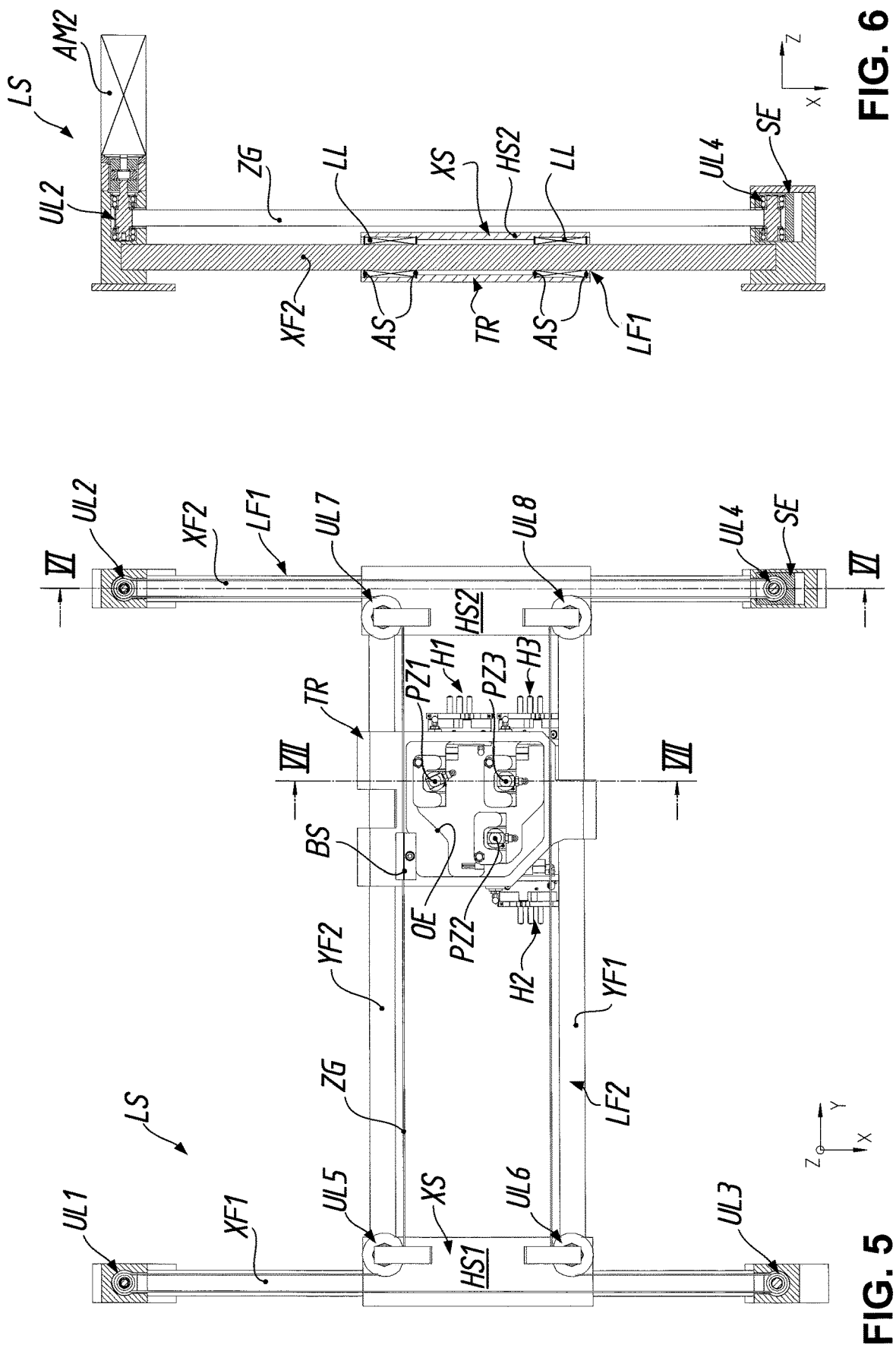
FIG. 5 shows a partly broken-away plan view of the loading system, which is shown in isolation in FIG. 4, of the deblocking apparatus according to FIG. 1, without valve terminal at the carrier, particularly for illustration of the path of a cogged belt as traction element for the movement of the carrier, which is arranged to be movable at the linear guide units under guidance in an H shape around deflections and is secured to the carrier.
FIG. 6 shows a sectional view of the loading system of the deblocking apparatus according to FIG. 1 in correspondence with the section line VI-VI in FIG. 5.

As FIGS. 4 and 5, in particular, show, the loading system LS generally comprises a carrier TR, which is movable in a movement plane x-y by way of two linear guide units LF1, LF2 and which carries three holders H1, H2, H3 movable in a transverse direction z with respect to the movement plane x-y. Of these, a first holder H1 (concealed in FIGS. 1 and 2) is assigned to the spectacle lenses L blocked on block pieces B, a second holder H2 is assigned to the deblocked spectacle lenses L and a third holder H3 is assigned to the block pieces B.

A feature of this loading system LS is that—as explained in more detail in the following—the linear guide units LF1, LF2 are constructed and arranged in the form of an H gantry, with two stationary drive motors AM1, AM2 for drive—in the same sense or in opposite sense—of a traction element ZG which is movably arranged in an H shape at the linear guide units LF1 and LF2 and is attached to the carrier TR.

In addition, FIGS. 1 and 2 show a control cabinet SS, which is arranged behind the machine frame MG, for the deblocking apparatus AV as well as a suction device SU, which is positioned adjacently on the right and which is connected with the second sub-station PS2 of the loading station PS and the cleaning station CS. A funnel-shaped housing section TG for collection in common of pressure medium, blocking material and other residues for preparation or disposal is arranged, as can be seen in FIGS. 1 and 2, below the deblocking and cleaning stations DS, CS, which are themselves positioned below the loading station PS for best possible draining of the water needed in the process. Finally, a control panel BF, by way of which the deblocking apparatus AV can be controlled, is secured to the machine frame MG at the front left in FIGS. 1 and 2.

Before the loading system LS is described in detail, the machine concept of the deblocking apparatus AV with the afore-mentioned workpiece holding arrangement WH shall firstly be briefly explained. A feature of the workpiece holding arrangement WH is that the workpiece holding arrangement WH comprises a plurality of partition walls TW (marked in, for example, FIGS. 14, 15, 20 and 21), which separate and delimit four work spaces AR1, AR2, AR3 and AR4 from one another, of which in FIGS. 1 to 3, 14, 15, and 20 merely the first work space AR1 and in FIGS. 21 to 35 only the fourth work space AR4 are to be seen (also designated in these figures by the Roman numerals II or IV IV respectively applied at the end). In that case, an individual workpiece holder CH, as, for example, FIGS. 1 to 3 show-here in each instance in the form of a clamping chuck—is associated with each of the work spaces AR1, AR2, AR3 and AR4 for parallel use for different spectacle lenses L.

The work spaces AR1, AR2, AR3 and AR4 can be moved in common together with the workpiece holding arrangement WH with respect to the machine frame MG so that each work space AR1, AR2, AR3 and AR4 can be selectably moved from the loading station PS, which is stationary at the machine frame MG, to the treatment or processing station DS, CS physically spaced from the loading station, and conversely. More precisely, each work space AR1, AR2, AR3 and AR4 can be displaced together with the workpiece holding arrangement WH in a movement cycle (indicated by a central round arrow in FIG. 21) from the first sub-station PS1 of the loading station PS via the cleaning station CS and the second sub-station PS2 of the loading station PS back to the first sub-station PS1 of the loading station PS so that the work spaces AR1, AR2, AR3 and AR4 can be used simultaneously for different spectacle lenses L and different processes (loading, deblocking, cleaning, unloading).

Figure 3:
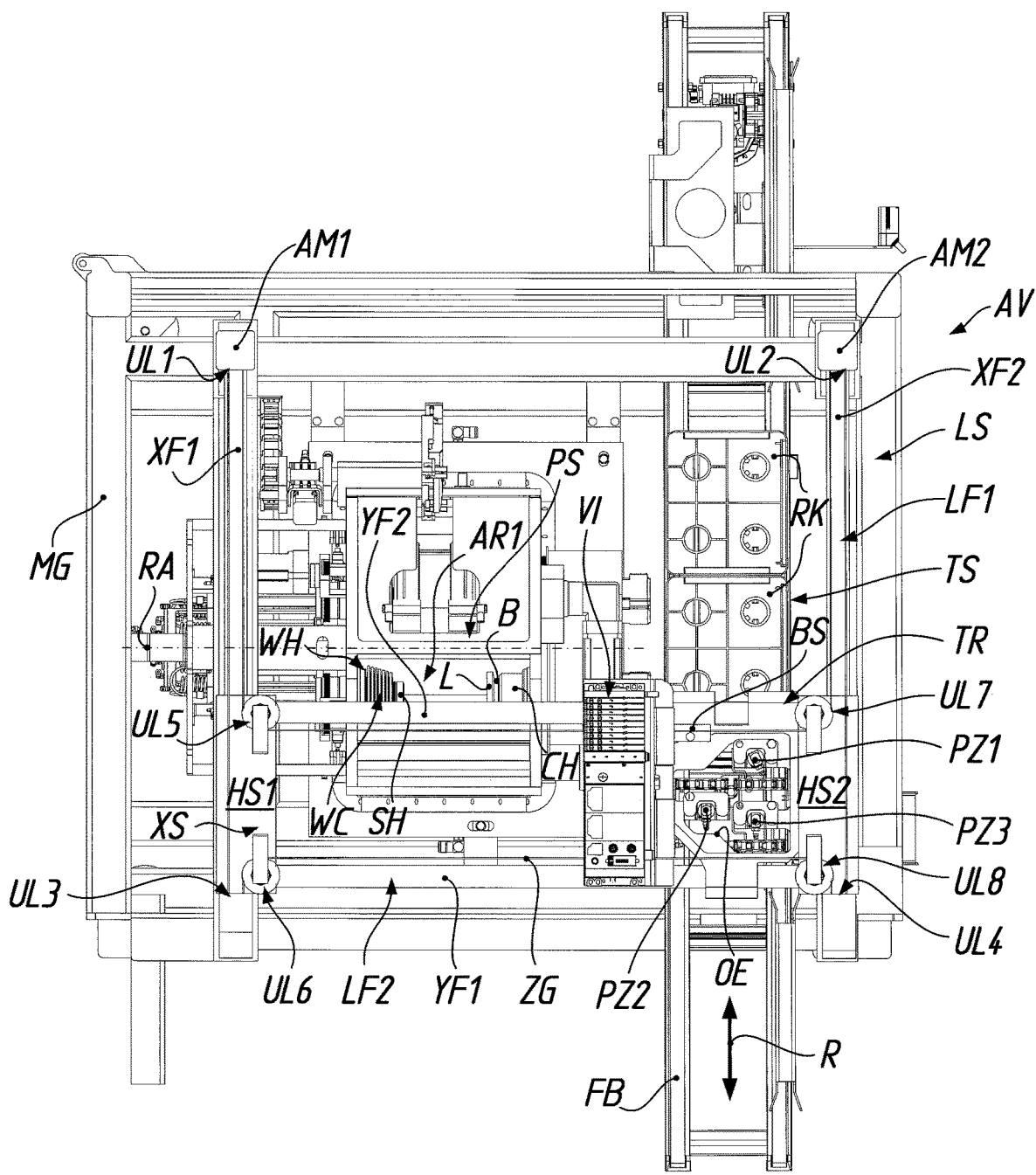
FIG. 3 shows a plan view of the deblocking apparatus according to FIG. 1, in which a carrier, which is movable in a movement plane x-y by way of linear guide units arranged in H shape, of the loading system with holders—which are movable transversely with respect to the movement plane x-y—for the spectacle lenses and block pieces is disposed above a conveyor belt of the transfer station, the belt being provided for transport of job trays for reception of the spectacle lenses and block pieces in the blocked or deblocked state.

For that purpose, the work spaces AR1, AR2, AR3 and AR4 of the workpiece holding arrangement WH together with their workpiece holders CH are arranged to be rotatable about a common axis RA of rotation (see, in that regard, FIGS. 1 and 3 as well as 16 to 35). The overall result is a drum-like construction of the workpiece holding arrangement WH with two mutually opposite end walls SW1, SW2 (marked in FIGS. 14, 15, 20, 21 and 32 to 35), between which the partition walls TW separating the work spaces AR1, AR2, AR3 and AR4 are arranged. In that regard, the axis RA of rotation runs through the mutually parallel end walls SW1, SW2.

Whereas a first end wall SW1 of the workpiece holding arrangement WH of drum-like construction carries the workpiece holders CH, as can be readily seen in, for example, FIGS. 32 to 35, a second end wall SW2 of the workpiece holding arrangement WH carries, according to, for example, FIGS. 14, 15, 20 and 21, workpiece counter-holders WC which are aligned with the workpiece holders CH. Not only the workpiece holders CH, but also the workpiece counter-holders WC are, in addition, each mounted to be rotatable about the longitudinal axis LA1 or LA2 thereof (marked in FIGS. 22, 23, 34 and 35). In other words, the result is a circular arrangement of four spindle pairs which are uniformly mutually angularly spaced from one another around the axis RA of rotation. Moreover, the workpiece counter-holders WC are each axially displaceable along the longitudinal axis LA2 thereof parallel to the axis RA of rotation. In that regard, the workpiece counter-holders WC are each provided at the end thereof projecting into the respective work space AR1, AR2, AR3 and AR4 with a suction head SH for holding the spectacle lens L, as, for example, FIGS. 2 and 3 show.

Further details of the loading system LS can now be inferred from, in particular, FIGS. 5 to 10. As can be readily recognized at the outset in FIGS. 4 and 5, one linear guide unit LF1 for the x direction comprises two x guide elements XF1, XF2 extending parallel to one another. The x guide elements XF1, XF2 are mounted, according to, for example, FIGS. 1 and 2, on the machine frame MG in fixed location. As FIGS. 4 and 6, in particular, show, the x guide elements XF1, XF2 are solid guide rods with a round cross-section.

A respective x half-carriage HS1, HS2 is guided at each of the x guide elements XF1, XF2 to be longitudinally displaceable. For that purpose each x half-carriage HS1, HS2 is provided—as illustrated in the section according to FIG. 6 for the x half-carriage HS2—with two axially mutually spaced-apart linear bearing elements LL, which co-operate with the respective guide rod associated as x guide element XF1, XF2.

By contrast, the other linear guide unit LF2 for the y direction comprises, according to, in particular, FIGS. 4 and 5, two y guide elements YF1, YF2 which extend parallelly to one another and transversely to the x guide elements XF1, XF2. The y guide elements YF1, YF2 rigidly connect the x half-carriages HS1, HS2 together so that the x half-carriages HS1, HS2 and the y guide elements YF1, YF2 together form an x carriage XS.

Figure 7:
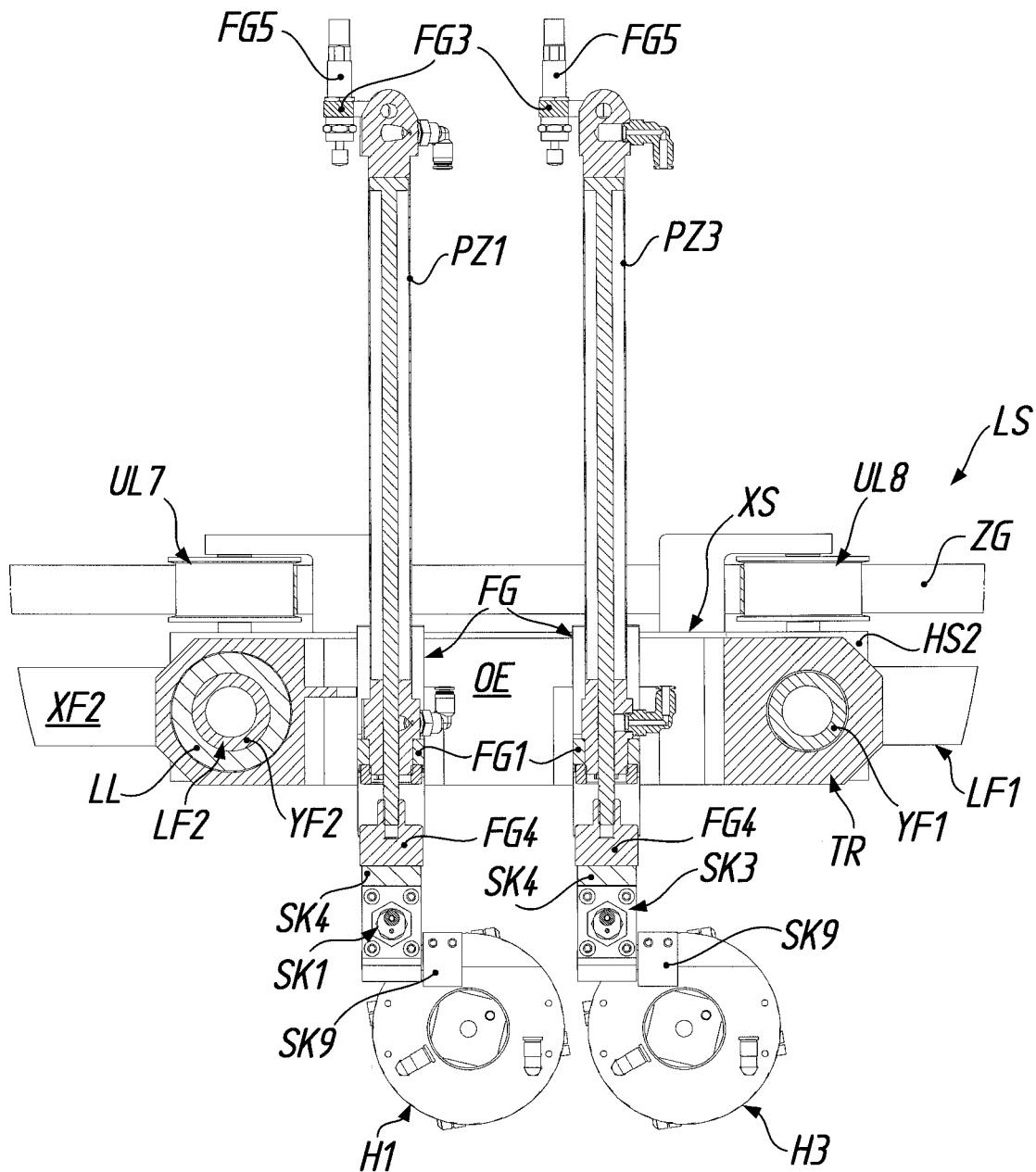
FIG. 7 shows a sectional view, which is broken away towards both sides and which is turned in the plane of the drawing through 90° in anticlockwise sense, of the loading system of the deblocking apparatus according to FIG. 1 in correspondence with the section line VII-VII in FIG. 5.
Figure 8:
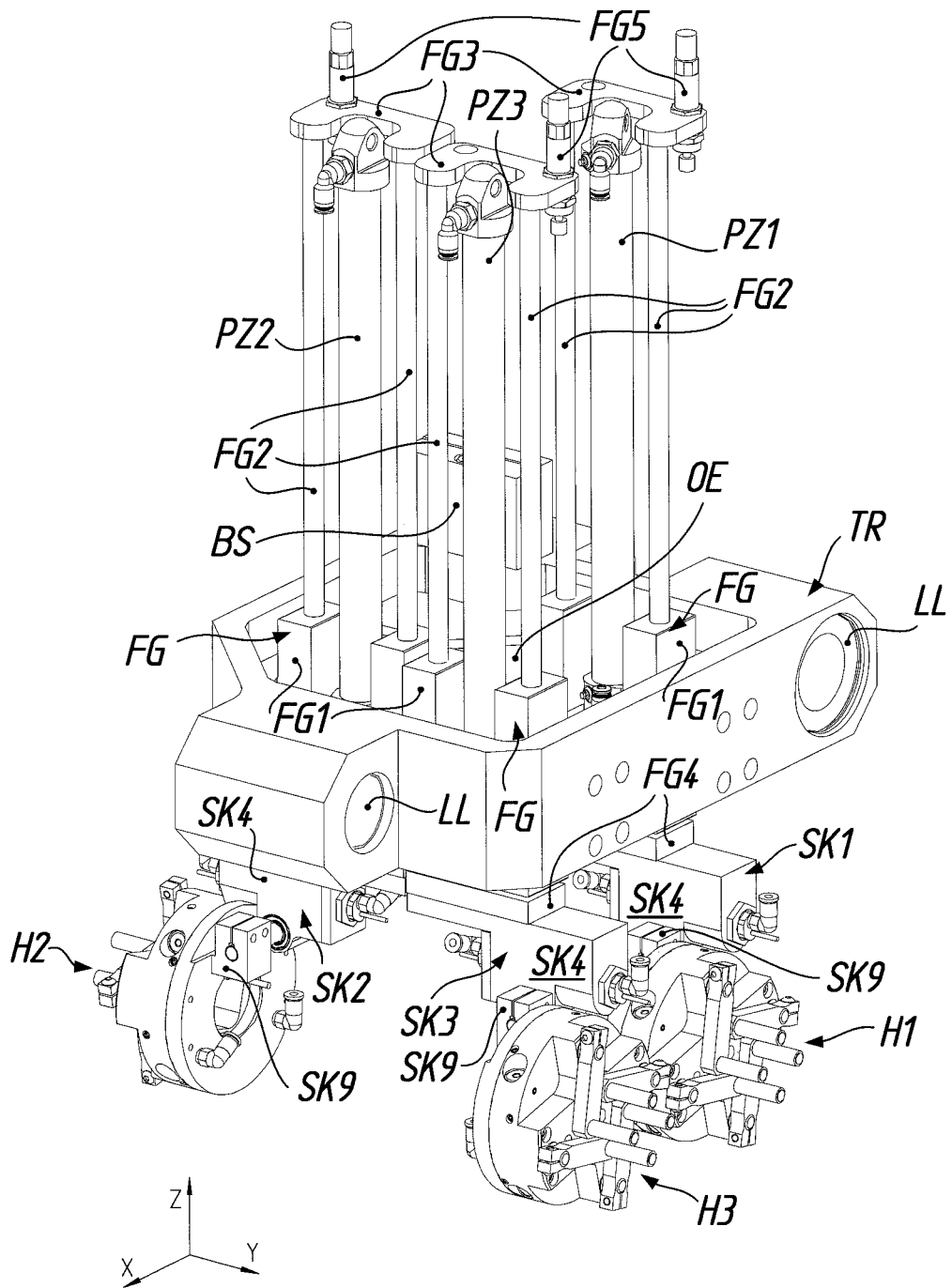
FIG. 8 shows a perspective view of the carrier, which is constructed as a Y carriage and is separated from the loading system—shown in FIG. 4—of the deblocking apparatus according to FIG. 1, of the loading system from obliquely above and front right, with three holders, which are movable transversely with respect to the movement plane x-y, for the spectacle lenses and block pieces.
Figure 9:
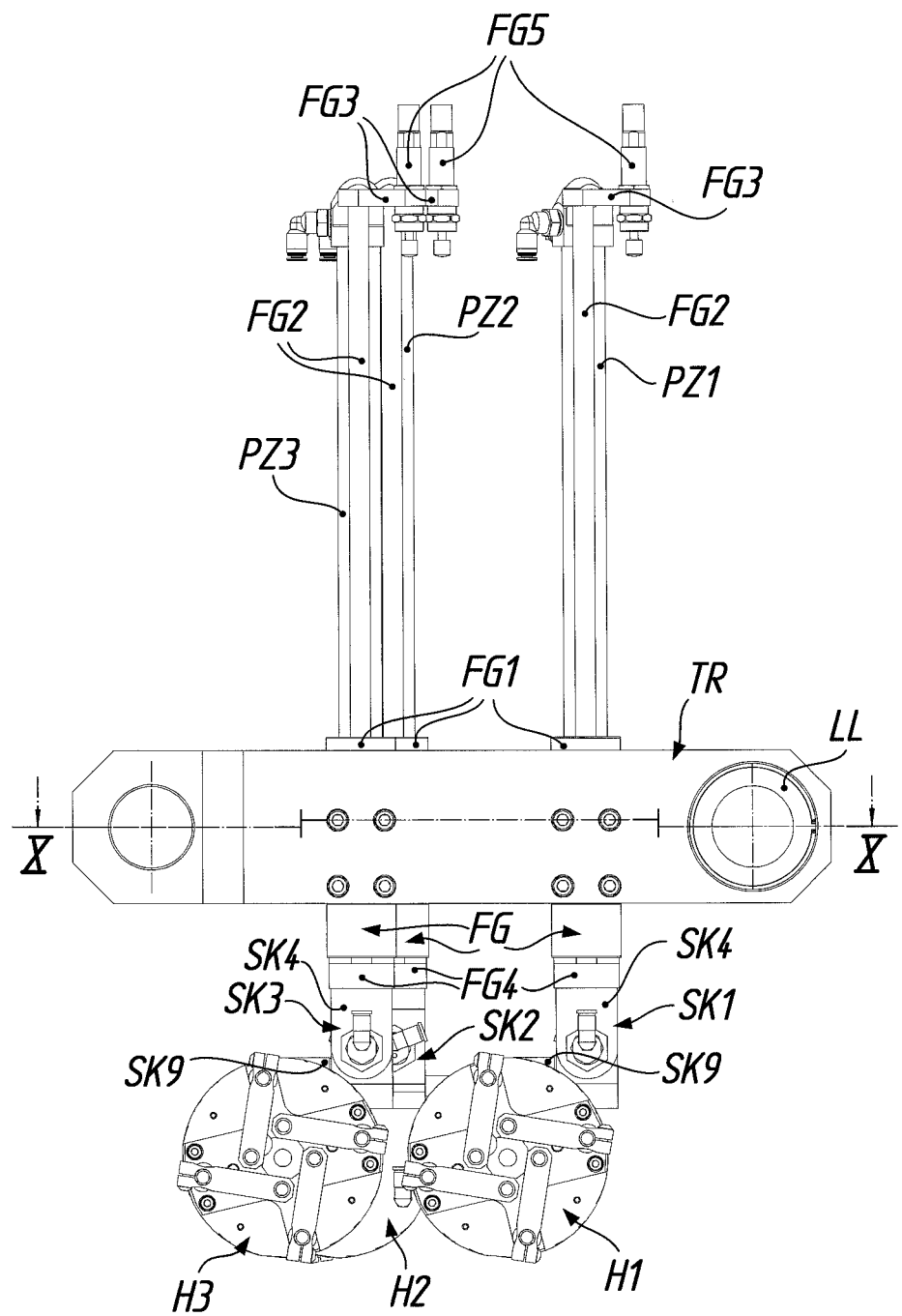
FIG. 9 shows a side view of the carrier according to FIG. 8 with the holders, from the right in FIG. 8.

As can be best seen in the section according to FIG. 7, the y guide elements YF1, YF2 are also guide rods with a round cross-section. However, in distinction from the x guide elements XF1, XF2 the y guide elements YF1, YF2 are constructed as hollow bodies, thus tubular. High useful loads are achieved through use of the guide rods; in that regard, the hollow-body construction ensures a low weight and is conducive to a high dynamic.

The afore-mentioned carrier TR as y carriage is guided at the y guide elements YF1, YF2 to be longitudinally displaceable. For that purpose, the carrier TR according to FIG. 10 comprises three mutually spaced-apart linear bearing elements LL, of which two linear bearing elements LL co-operate with the y guide element YF2 constructed as a guide rod, whilst the other linear bearing element LL co-operates with the other y guide element YF1 constructed as a guide rod. The result is thus a statically defined mounting of the carrier TR, which is constructed as a y carriage, at the y guide elements YF1, YF2.

Figure 10:
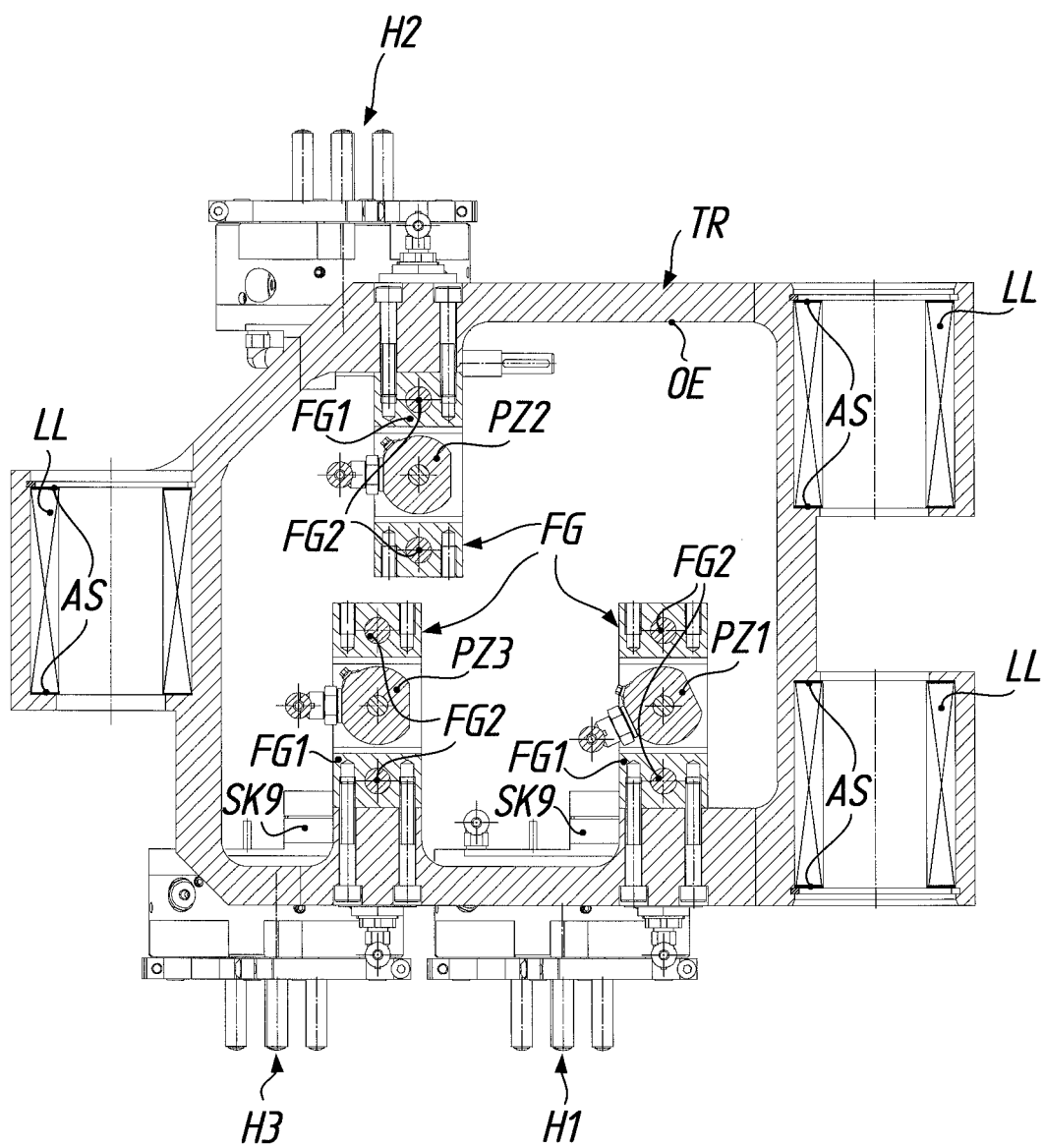
FIG. 10 shows a sectional view of the carrier according to FIG. 8 with the holders, in correspondence with the doubly offset section line X-X in FIG. 9.
Figure 11:
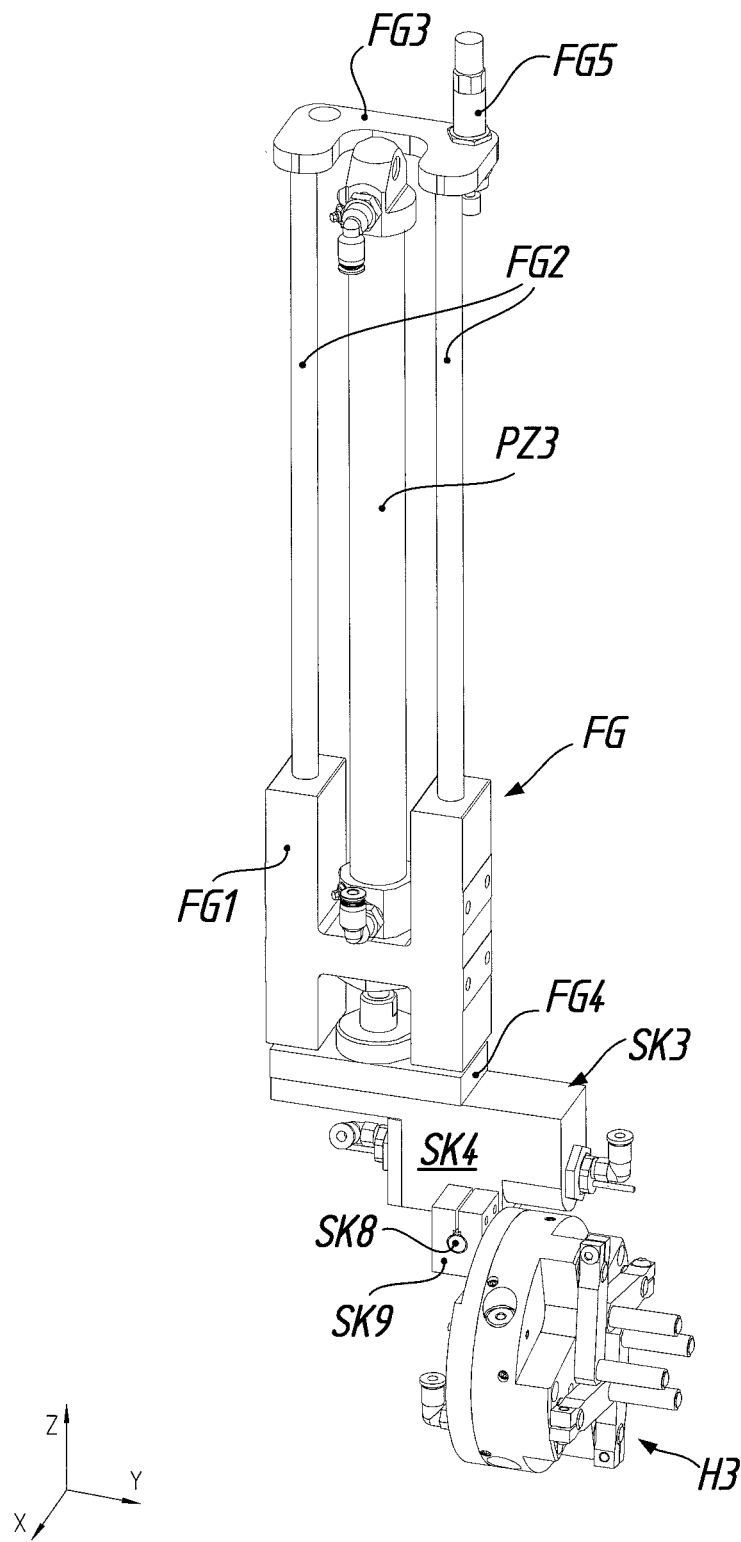
FIG. 11 shows a perspective view of the holder, which is at the front in FIG. 8 and is constructed as a multi-finger gripper, from obliquely above and front right, which together with an associated pneumatic cylinder as well as guide arrangement and an associated pivot mechanism is illustrated separated from the carrier according to FIG. 8.
Figure 12:
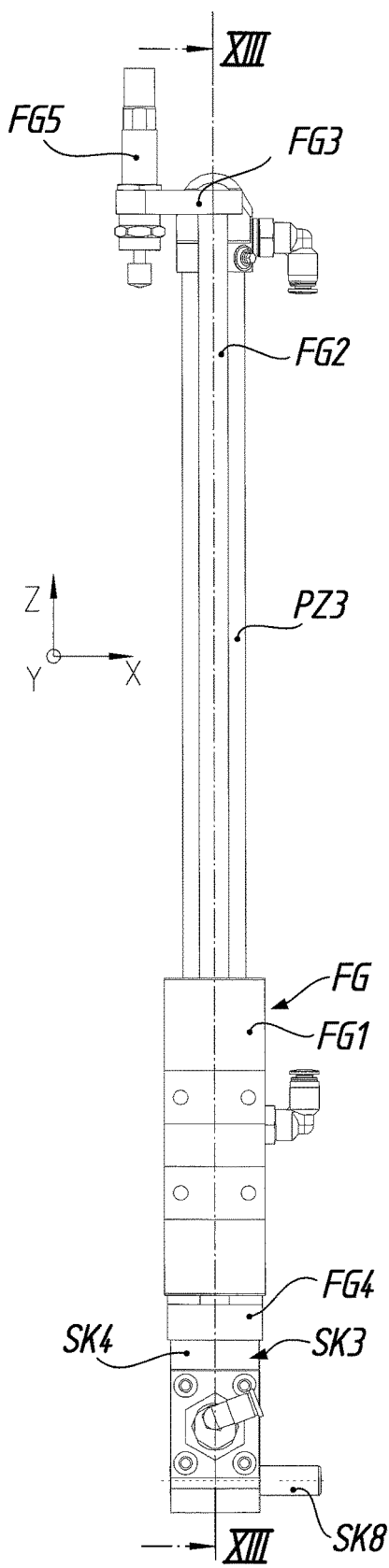
FIG. 12 shows a side view of the pneumatic cylinder with guide arrangement and of the pivot mechanism, which are associated with the holder according to FIG. 11, from the left in FIG. 11, without the holder.

Not only the respective two linear bearing elements LL at the x half-carriages HS1, HS2, but also the three linear bearing elements LL at the carrier TR constructed as y carriage are ball bushings. In that case, a stripper AS is associated with each of the linear bearing elements LL at the two longitudinal sides, as schematically illustrated in FIGS. 6 and 10.

In this connection it is to be mentioned that the loading system LS in the case of use, which is described here, in or at the deblocking apparatus AV is exposed to special use conditions. Due to the deblocking and cleaning processes with high pressure (water as medium with a temperature of up to 50° Celsius) an extremely high level of humidity arises in the deblocking apparatus AV. This humidity precipitates on all components. The afore-described embodiment of the guide system comprising round rods and ball bushings with strippers has proved advantageous here inasmuch as the loading system LS is capable of permanently withstanding not only the mechanical and dynamic loads, but also these environmental conditions.

By virtue of the afore-described arrangement of the linear guide units LF1, LF2 the result is substantially an H shape as can be readily recognized in FIG. 5. The thus-formed H gantry is completed by deflections and drives for the traction element ZG. More precisely and according to, in particular, FIG. 5 two 180° deflections UL1, UL2, UL3, UL4 for the traction element ZG are associated with each of the stationary x guide elements XF1, XF2 at the ends. On the other hand, each of the x half-carriages HS1, HS2 carries two 90° deflections UL5, UL6, UL7, UL8 for the traction element ZG. In that case, as illustrated in FIG. 4, one (UL1) of the 180° deflections UL1, UL3 is drivable at one x guide element XF1, which is on the left in FIG. 4, by one (AM1) of the stationary drive motors AM1, AM2. Independently thereof, the other one (UL2) of the 180° deflections UL2, UL4 at the other x guide element XF2, which is on the right in FIG. 4, is drivable by the other one (AM2) of the stationary drive motors AM1, AM2.

In the illustrated embodiment the traction element ZG is a cogged belt. At least the deflections UL1 and UL2 provided for this purpose at the stationary drive motors AM1, AM2 and driven by these are formed by correspondingly toothed belt pulleys. A precise control of the movement of the carrier TR is possible through the thus-produced mechanically positive and therefore slip-free movement transmission.

In this connection, it is additionally to be inferred particularly from FIG. 5 that the traction element ZG is secured to the carrier TR at a securing point BS (belt clamping) seated near the two linear bearing elements LL which both co-operate with the y guide element YF2 constructed as a guide rod. Tilting moments, which might detract from accuracy, at the carrier TR are thereby avoided.

Moreover, it is additionally indicated in FIG. 5 at the lower right and FIG. 6 at the bottom that the 180° deflection UL4 at the x guide element XF2 is provided with a tensioning device SE for the traction element ZG, here in the form of a bearing block which can be displaced by set screws (not shown) in x direction and fixed, so as to tension the traction element ZG.

As seen in the plan view according to FIG. 5, the following movements of the carrier TR in the movement plane x-y of the H gantry can thus be generated: If the two 180° deflections UL1, UL2 are driven at the same speed and with positive direction of rotation (i.e. in clockwise sense), then the carrier TR moves on the y guide elements YF1, YF2 in positive y direction, i.e. to the right in FIG. 5. If drive of the two 180° deflections UL1, UL2 takes place at the same speed and in negative direction of rotation (i.e. in anticlockwise sense), then the carrier TR moves on the y guide elements YF1, YF2 in negative y direction, i.e. to the left in FIG. 5.

A movement of the carrier TR in positive x direction, i.e. downwardly in FIG. 5, arises when the 180° deflection UL2 on the right as seen in the plan view is driven in negative direction of rotation and the 180° deflection UL1 on the left as seen in the plan view is driven in positive direction of rotation at the same speed, whereby the x carriage XS together with the carrier TR arranged thereon is drawn downwardly in FIG. 5. Correspondingly, the carrier TR in the case of a reversal of direction of rotation at the two 180° deflections UL1, UL2 is moved together with the x carriage XS in negative x direction, i.e. upwardly in FIG. 5.

If only the 180° deflection UL1 on the left as seen in the plan view is driven in positive direction of rotation, whilst the 180° deflection UL2 on the right is stationary, then the carrier TR moves on the Y guide elements YF1, YF2 in positive y direction, whilst the x carriage XS is displaced on the stationary x guide elements XF1, XF2 in positive x direction, so that the carrier TR in sum moves in the movement plane x-y diagonally in positive y direction and positive x direction, i.e. downwardly to the right in FIG. 5. This can be reversed by a reversal of direction of rotation at the lefthand 180° deflection UL1, so that the carrier TR moves diagonally in negative y direction and negative x direction, i.e. upwardly to the left in FIG. 5.

In analogous manner, when the lefthand 180° deflection UL1 is stationary a diagonal movement of the carrier TR in positive y direction and negative x direction (i.e. upwardly to the right in FIG. 5) or in negative y direction and positive x direction (i.e. downwardly to the left in FIG. 5) can be produced by the righthand 180° deflection UL2 being driven in clockwise sense or anticlockwise sense, respectively. Moreover, the carrier TR can travel over any desired path in the movement plane x-y of the H gantry through suitable superimposition of the drive motions.

Further details with respect to the movement possibilities of the holders H1, H2, H3 relative to the carrier TR can be inferred from FIGS. 7 to 13. Accordingly, the holders H1, H2, H3 are each movable by a respectively associated pneumatic cylinder PZ1, PZ2, PZ3 in the transverse direction z with respect to the movement plane x-y and, in fact, independently of one another. Moreover, each holder H1, H2, H3 is pivotable by a respectively associated pneumatic pivot mechanism SK1, SK2, SK3 from a position aligned with the transverse direction z to a position oriented substantially perpendicularly to the transverse direction z, and conversely. These pivot movements are also dependent on one another. Finally, in the illustrated embodiment each holder H1, H2, H3 is formed as a pneumatically actuable multi-finger gripper and can be actuated individually, i.e. again independently of the other holders.

A valve terminal, which is denoted generally by the reference VI and which is arranged on the carrier TR constructed as y carriage, i.e. laterally flange-mounted thereon (see FIGS. 1 to 4), is provided for activation of the pneumatic cylinders PZ1, PZ2, PZ3, the pneumatic pivot mechanisms SK1, SK2, SK3 and the pneumatically actuable multi-finger grippers H1, H2, H3. The sensors of the loading system LS are connected with the valve terminal VI. Thus, it is merely necessary to supply the valve terminal VI with energy, i.e. electrically and pneumatically; further subdivision at the afore-mentioned pneumatic consumers takes place from the valve terminal VI and accompanies the carrier TR. There is thus only a need for a small number of electrical cables—powerlink (bus), electrical energy—and pneumatic hoses—compressed air for the above pneumatic consumers, supplementary control air—as feed lines. The energy supply is correspondingly simple, small and light and thus designed for rapid accelerations and speeds of the loading system LS.

As FIG. 10, in particular, shows, the carrier TR itself as seen in plan view is of substantially O-shaped construction, with a central opening OE in which the holders H1, H2, H3 are mounted to be movable in the transverse direction z with respect to the movement plane x-y. More precisely, first and foremost an identically constructed linear guide FG is associated with each of the holders H1, H2 and H3. According to, in particular, FIG. 11, each of the linear guides FG has a substantially H-shaped guide block FG1, which is screw-connected by a transverse side in the region, i.e. within the opening OE, with the carrier TR, as illustrated in FIG. 10. Guide bores which extend parallel to one another in z direction and through each of which a round guide rod FG2 passes are formed in the two limbs of the H-shaped guide block FG1. The two guide rods FG2 are fixedly connected together by way of a cross member FG3 above the guide block FG1; provided below the guide block FG1 is a flange plate FG4 which connects the guide rods FG2 together, as, for example, shown merely schematically in FIG. 13. It will be apparent that the guide rods FG2, the cross member FG3 and the flange plate FG4 form a unit, which can be moved relative to the guide block FG1 in the z direction under guidance at the guide block FG1.

Figure 13:
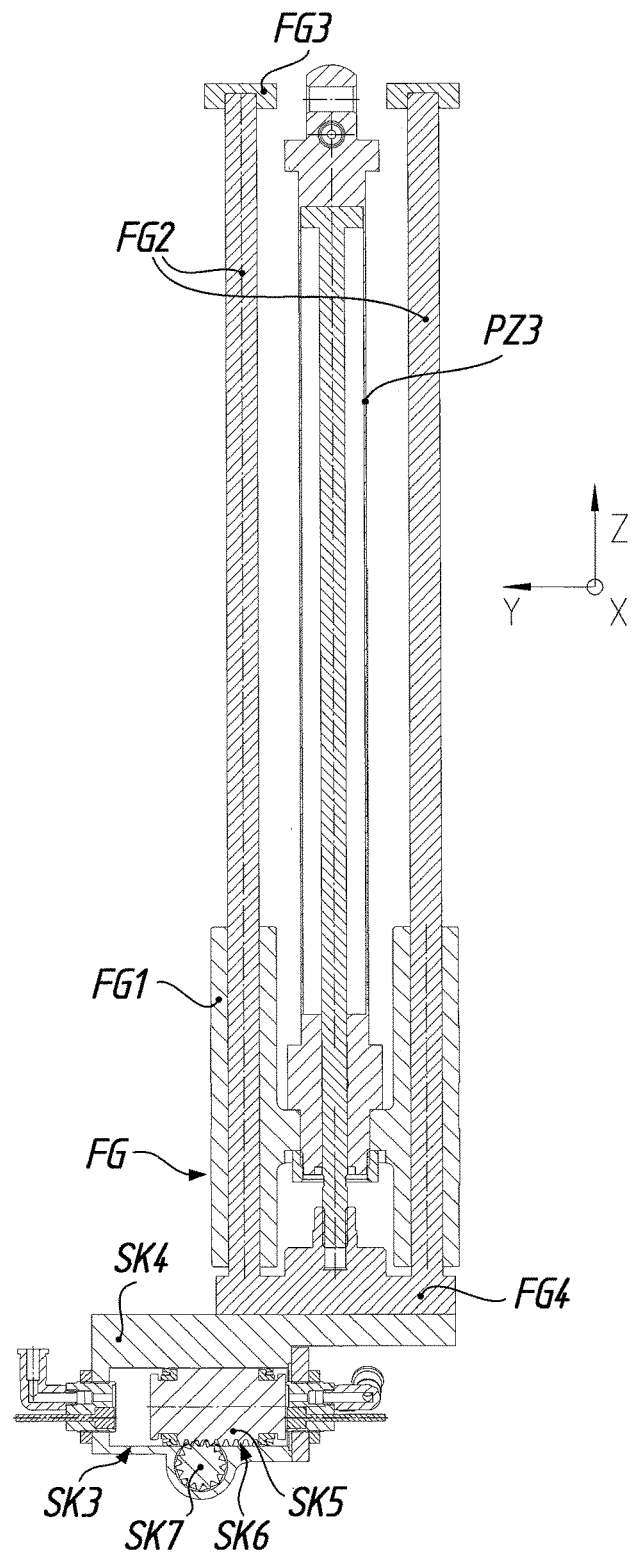
FIG. 13 shows a sectional view of the pneumatic cylinder with guide arrangement and of the pivot mechanism for the holder according to FIG. 11, in correspondence with the section line XIII-XIII in FIG. 12.

Moreover, a connecting section between the two limbs of the H-shaped guide block FG1 according to FIG. 13 is provided with a passage bore. The respective double-acting pneumatic cylinder—in the example of FIGS. 11 to 13, the third pneumatic cylinder PZ3—is, according to FIGS. 11 and 13, flange-mounted by its cylinder housing from above on the connecting section of the guide block FG1 and passes by its piston rod through the passage bore in the connecting section. The piston rod of the pneumatic cylinder is screw-connected by its end, which is remote from the guide block FG1 and lower in FIGS. 11 and 13, with the flange plate FG4, as FIG. 13 shows. Depending on the pressure loading of a first or second effective surface of the double-acting pneumatic cylinder, the flange plate FG4 is thus guided by the guide rods FG2 in the z direction at the guide block FG1 in the direction of the guide block FG1, which is secured to the carrier TR, (upward direction) or away therefrom (downward direction). The upper end position of the flange plate FG4 is reached when the piston of the respective pneumatic cylinder comes into internal contact with the cylinder housing thereof (see FIG. 7 at the top). By contrast, the lower end position of the flange plate FG4 is settable in defined manner by a length-adjustable stop damper FG5, which according to FIGS. 7 to 9, 11 and 12 is mounted on the cross member FG3 of the linear guide FG and co-operates in travel-limiting manner with an associated abutment surface at the carrier TR.

From below, the respective pneumatic pivot mechanism SK1, SK2, SK3 is flange-mounted on each flange plate FG4, as FIGS. 7 to 9 and 11 to 13 show. Details with respect to the respective pivot mechanism are evident, in the example of the third pivot mechanism SK3, from the sectional view according to FIG. 13. Accordingly, the pivot mechanism SK3 comprises a housing SK4 which is flange-mounted on the flange plate FG4 and in which a pivot piston SK5 loadable with pressure on both sides is guided. A toothing SK6 in the form of a rack, which meshes with a gearwheel SK7, is formed at a longitudinal side of the pivot piston SK5. The gearwheel SK7 is connected with a shaft SK8 which is rotatably mounted in the housing SK4 and which according to, in particular, FIGS. 11 and 12 protrudes from the housing SK4. Finally, the holder H3 of the loading system LS is secured by a clamp SK9 to the part of the shaft SK8 projecting from the housing SK4, as can be readily recognized in FIGS. 8 and 11.

In the case of loading of one of the two effective surfaces of the pivot piston SK5 with pressure this can be moved from a first end position to a second end position and conversely, wherein the gearwheel SK7 is driven so that the holder H3, which is connected by way of the shaft SK8 and the clamp SK9, is pivoted from a horizontal position, as shown in FIGS. 7 to 11, into a vertical position, and conversely.

The construction and function of the pneumatically actuable multi-finger grippers provided in the illustrated embodiment as holders H1, H2, H3 are known per se, so that no further explanations with respect thereto are necessary at this point. These multi-finger grippers can be controlled so that they selectably grip or release a spectacle lens L or block piece B at the edge.

With regard to the three-dimensional arrangement of the holders H1, H2, H3 at the carrier TR it is additionally to be mentioned that the arrangement is such that in the state of the loading system LS being mounted on the machine frame MG the second holder H2 for the deblocked spectacle lenses L lies adjacent to the third holder H3 for the block pieces B as seen transversely to the transport direction R of the conveyor belt FB, as FIGS. 1 and 2 show, so that simultaneous operation can take place here.

Figure 16:
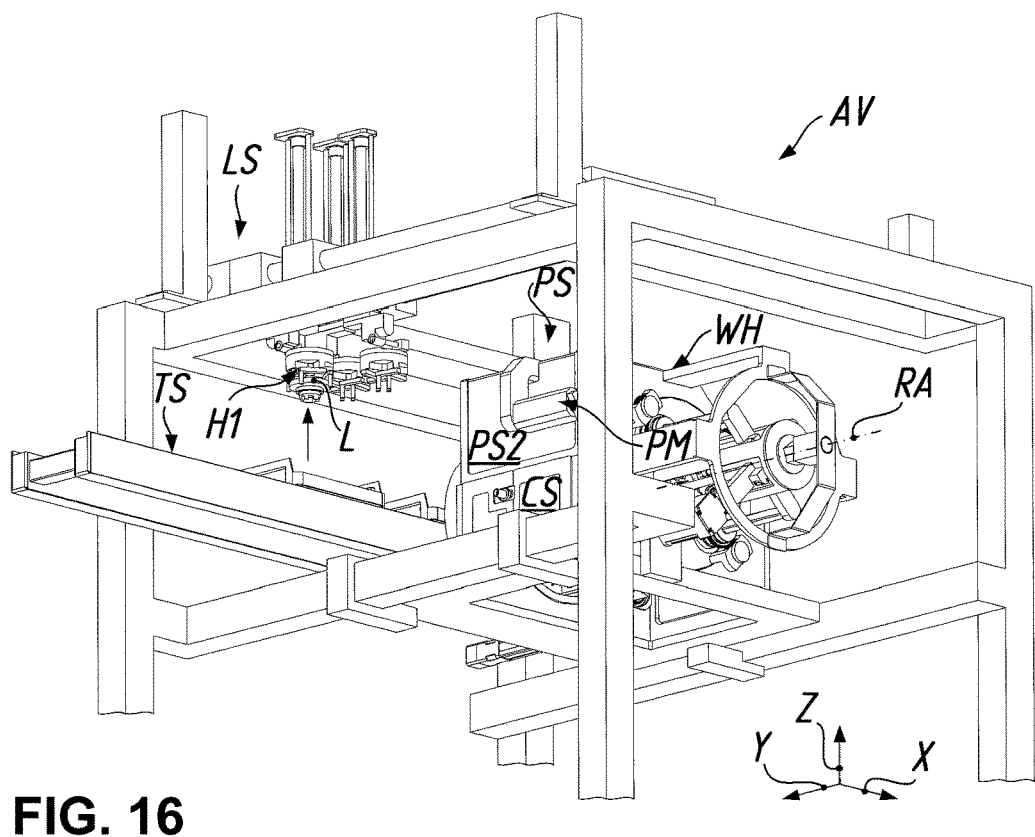
Figure 17:
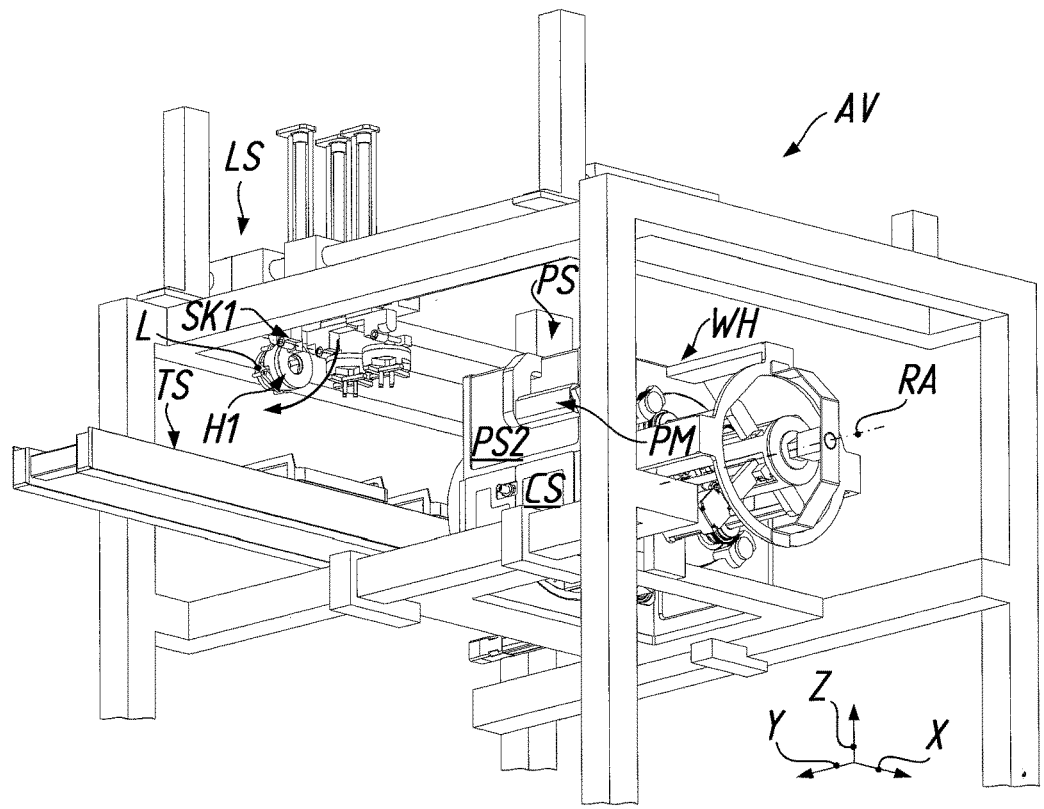
Figure 18:
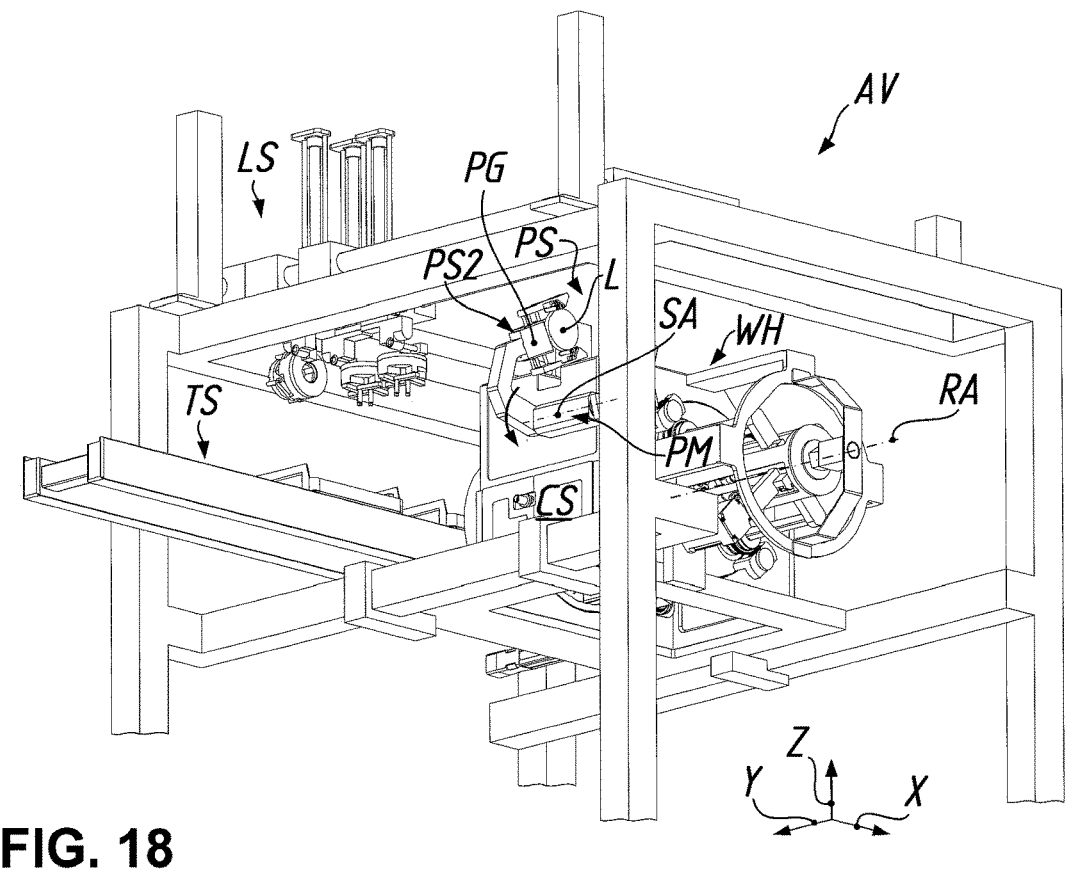

Finally, with regard to handling of the deblocked spectacle lenses L in the workpiece holding arrangement WH of the deblocking apparatus AV it remains to be mentioned at this point that according to, in particular, FIGS. 16 to 21 a pivot mechanism PM carrying a workpiece gripper PG, here in the form of a parallel gripper, is associated with the second sub-station PS2 of the loading station PS. Through appropriate activation of the pivot mechanism PM the workpiece gripper PG mounted thereon can be pivoted about a pivot axis SA, which is illustrated in FIG. 18, into the second sub-station PS2 of the loading station PS (as shown in FIGS. 16 and 17) or out of the second sub-station PS2, in correspondence with the arrow depicted in FIG. 18. A deblocked spectacle lens L can be selectably gripped or released at the edge by the workpiece gripper PG. Otherwise, with respect to handling of the spectacle lenses L and block pieces B in the workpiece holding arrangement WH of the deblocking apparatus AV express reference may be made at this point additionally to the afore-mentioned. U.S. Patent Application which is hereby incorporated by reference.

A fully automatic loading cycle and unloading cycle, which are possible with the afore-described loading system LS, of the deblocking apparatus AV shall be described in a time sequence thereof in the following with respect to the more schematic FIGS. 14 to 35, wherein in these figures for the sake of better clarity merely the references described for the respective figure are entered. In the present case, the loading system LS is oriented substantially horizontally. If in the following "horizontal" and "vertical" are mentioned, this means two directions (x direction, y direction) extending perpendicularly to one another. Even if by with these terms in the case of the embodiment shown herein there is description of directions which in reality run substantially horizontally or substantially vertical, this is not to be understood in a sense of restricting the possibility of the corresponding directions also lying anywhere in space as long as it remains ensured that "horizontal" and "vertical" extend perpendicularly to one another.

Figure 14:
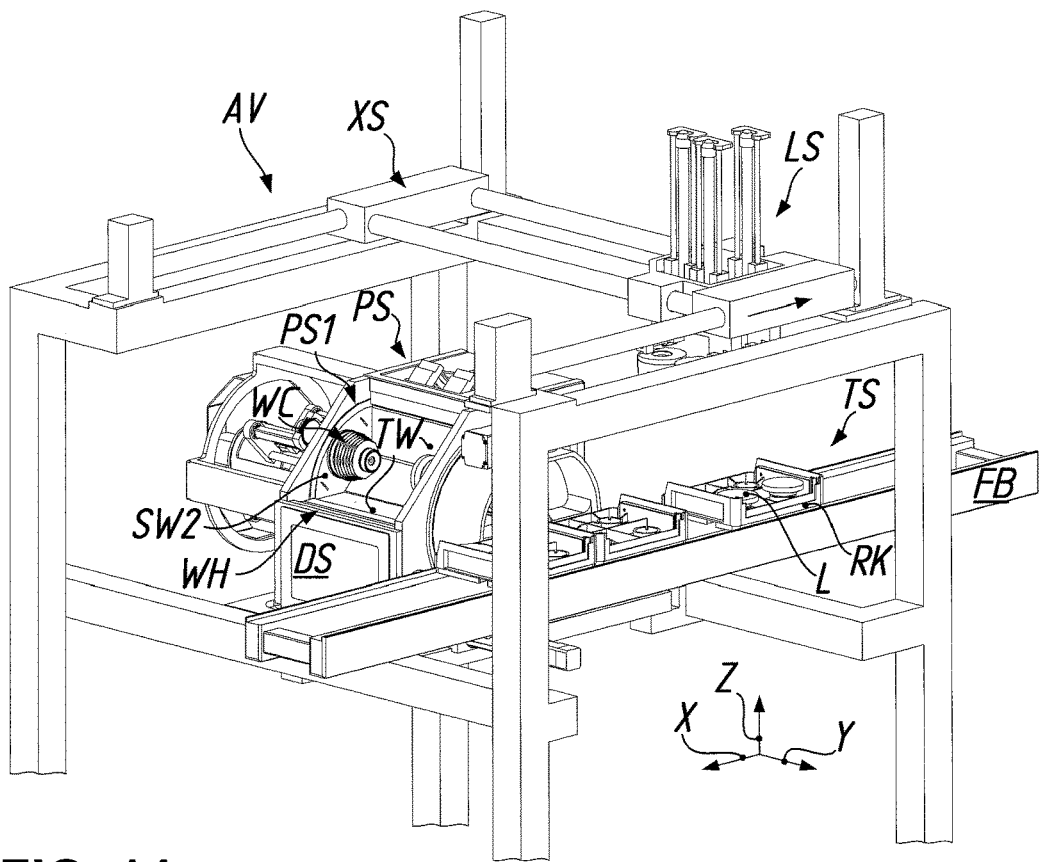
FIGS. 14 to 35 show perspective views of the deblocking apparatus according to FIG. 1, which illustrate a possible fully automatic deblocking process—with the assistance of the loading system according to the invention—in the time sequence thereof, wherein for simplification of the illustration the traction element for drive of the carrier together with deflections was omitted.

FIG. 14: The x carriage XS of the loading system LS travels into a position in which the vertically oriented first holder H1 (concealed in this figure by the machine frame MG) is disposed centrally above a blocked spectacle lens L, which is provided in x direction at the front in a job tray RK for deblocking, the tray being positioned on the conveyor belt FB in x direction at a rearmost position of the transfer station TS of the deblocking device apparatus AV.

Figure 15:
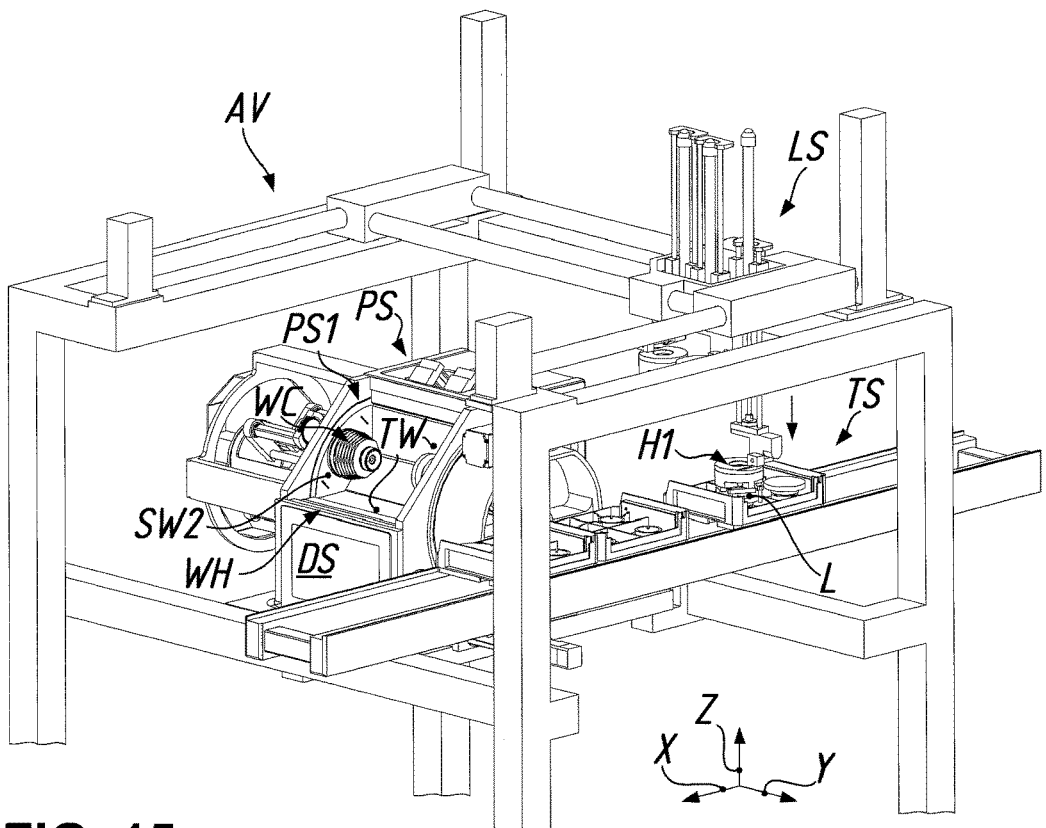

FIG. 15: The first holder H1 is moved in negative z direction into a lower end position in which the four fingers of the first holder H1 are disposed at a height suitable for gripping the blocked spectacle lens L.

FIG. 16: After the first holder H1 has gripped the blocked spectacle lens L, it is moved again in positive z direction into an upper end position.

FIG. 17: The first holder H1 is pivoted by the first pivot mechanism SK1 out of the vertical position into a horizontal position so that the center axis of the blocked spectacle lens L is oriented horizontally.

FIG. 18: A deblocked spectacle lens L held by the workpiece gripper PG is pivoted at the second sub-station PS2 of the loading station PS by the pivot mechanism PM for the workpiece gripper PG about the pivot axis SA out of the sub-station PS2 of the loading station PS.

Figure 19:
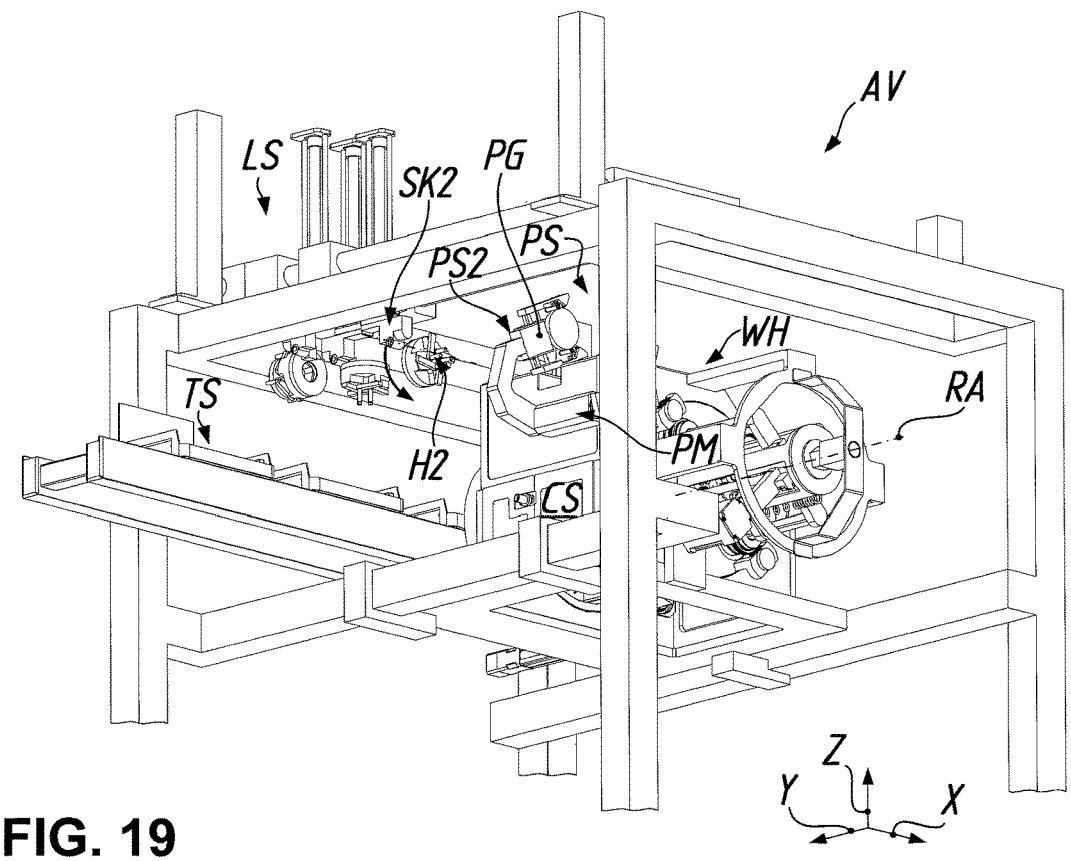

FIG. 19: The second holder H2 is similarly pivoted by the second pivot mechanism SK2 out of a vertical position into a horizontal position.

Figure 20:
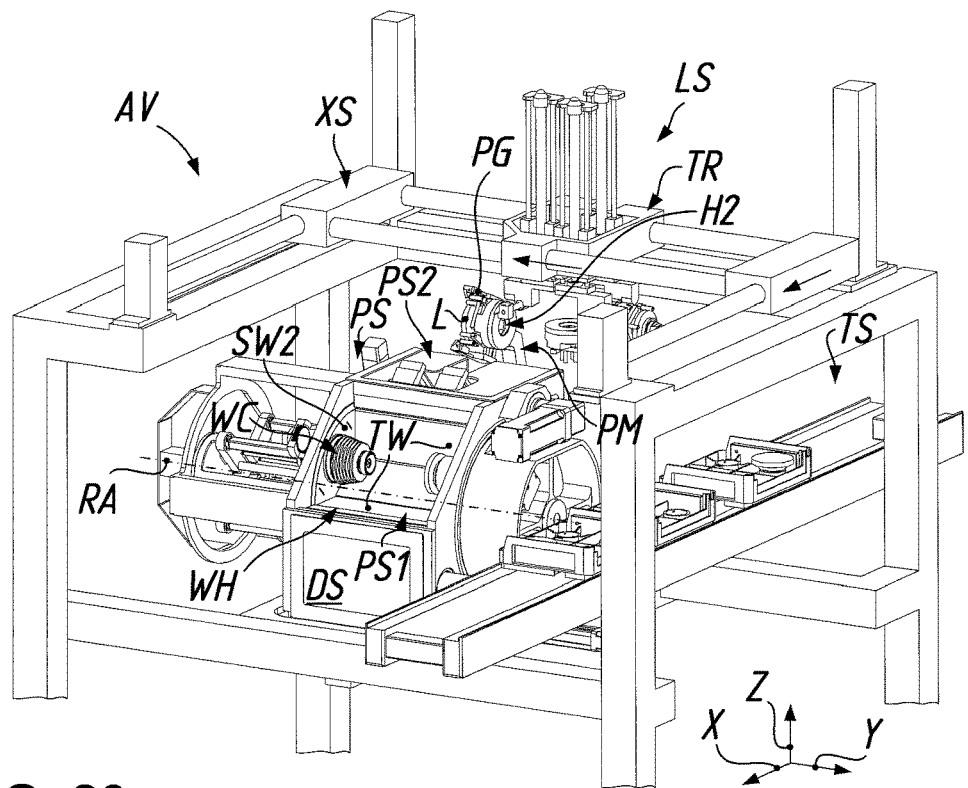

FIG. 20: The x carriage XS and the carrier TR are initially moved simultaneously in positive x direction and negative y direction until the second holder H2 is positioned at a defined spacing from the deblocked spectacle lens L held in the workpiece gripper PG; subsequently, movement of the carrier TR in negative y direction takes place until the four fingers of the second holder H2 are arranged around the edge of the deblocked spectacle lens L held in the workpiece gripper PG.

Figure 21:
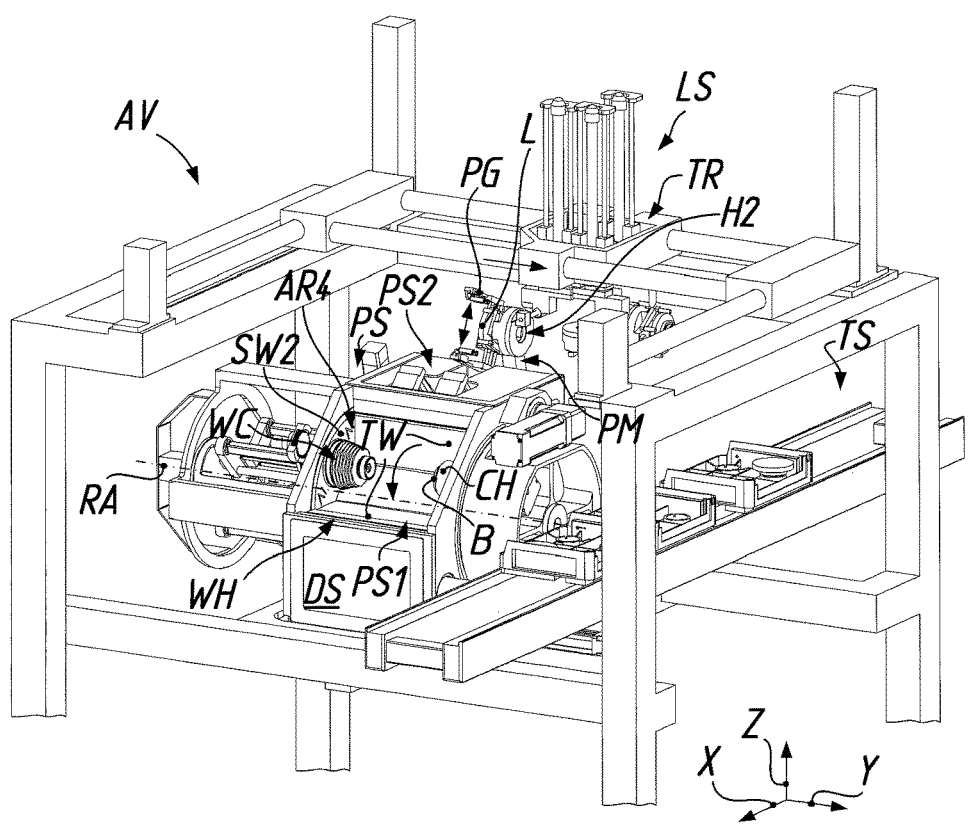

FIG. 21: The second holder H2 grips the deblocked spectacle lens L, the workpiece gripper PG is opened and the carrier TR is moved in positive y direction in order to move the deblocked spectacle lens L out of the pivot region of the workpiece gripper PG. At the same time the block piece B, which is still held in the workpiece holder CH of the fourth work space AR4 of the workpiece holding arrangement WH, which is present in the second sub-station PS2 of the loading station PS, is transported by rotation of the workpiece holding arrangement WH through 90° about the axis RA of rotation into the first sub-station PS1 of the loading station PS.

Figure 22:
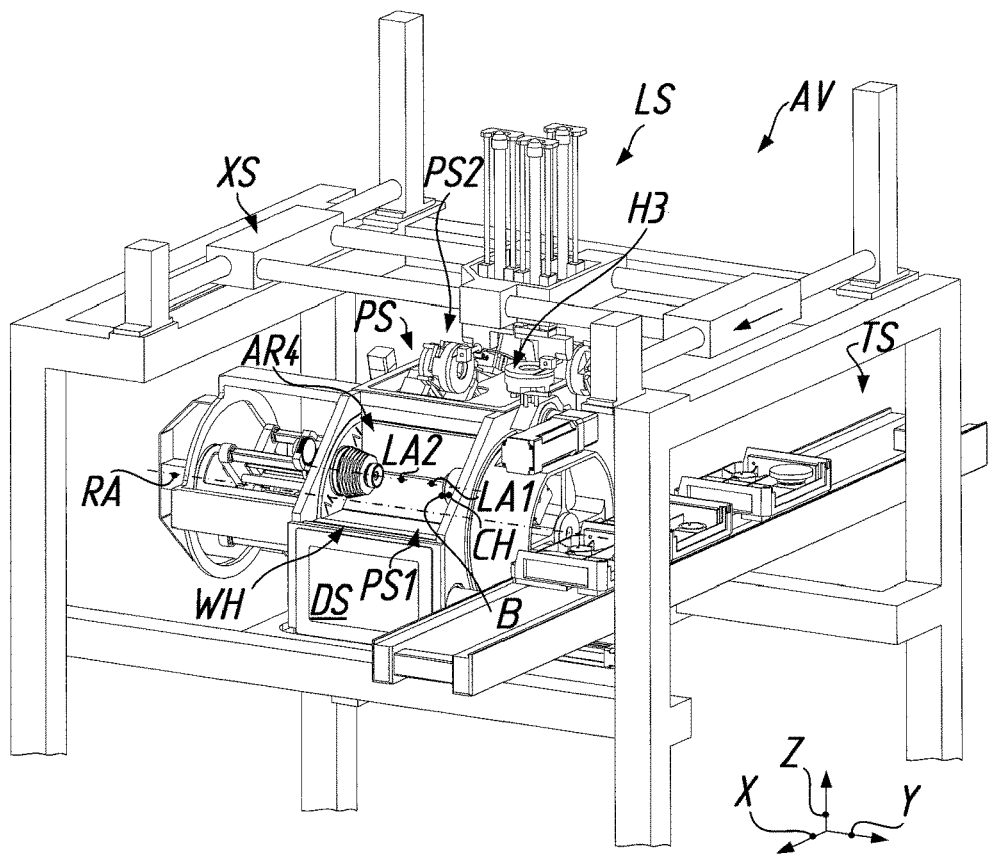

FIG. 22: The x carriage XS is moved in positive x direction until the third holder H3 is disposed above the longitudinal axis LA1 of the workpiece holder CH, which together with the fourth workspace AR4 of the workpiece holding arrangement WH is arranged in the first sub-station PS1 of the loading station PS.

Figure 23:
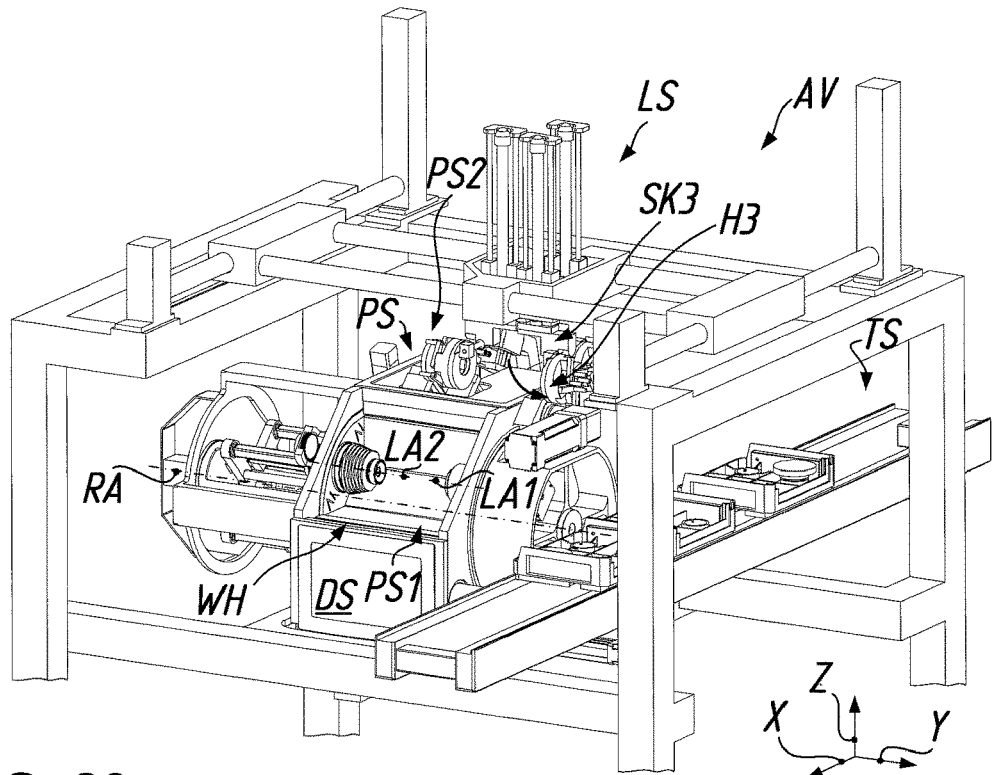

FIG. 23: The third holder H3 is pivoted by the third pivot mechanism SK3 out of the vertical position into the horizontal position.

Figure 24:
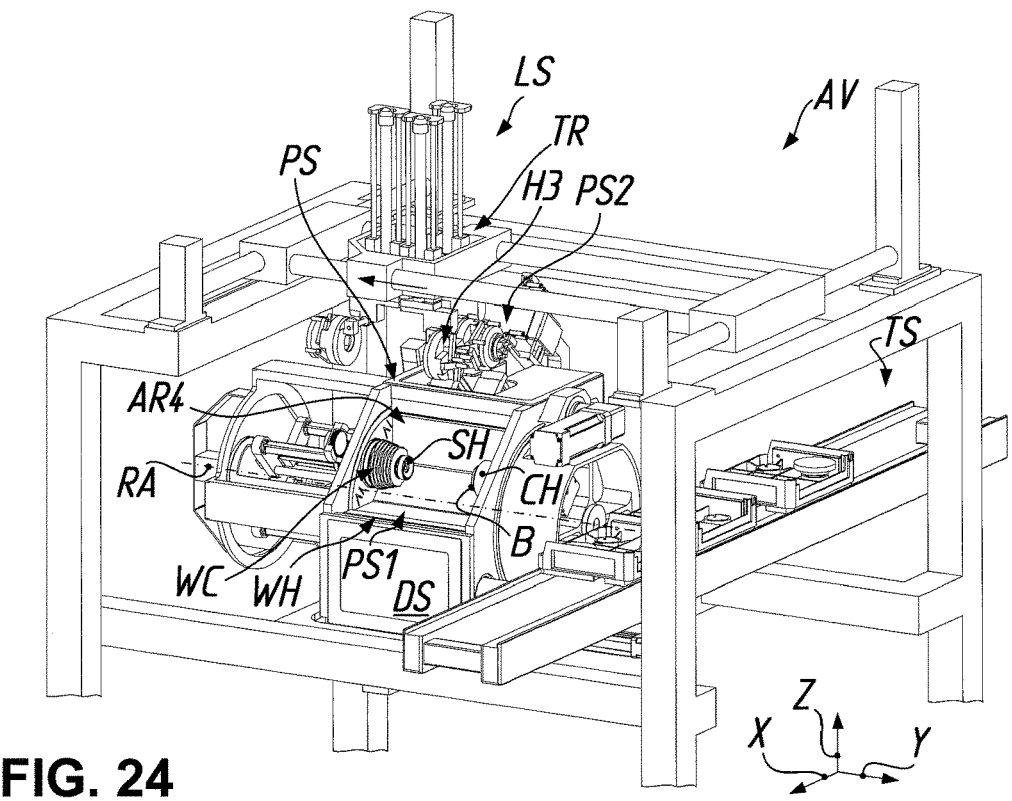

FIG. 24: The carrier TR is moved in negative y direction until the third holder H3 is positioned in y direction between the workpiece holder CH of the fourth work space AR4 and the oppositely disposed suction head SH of the corresponding workpiece counter-holder WC.

Figure 25:
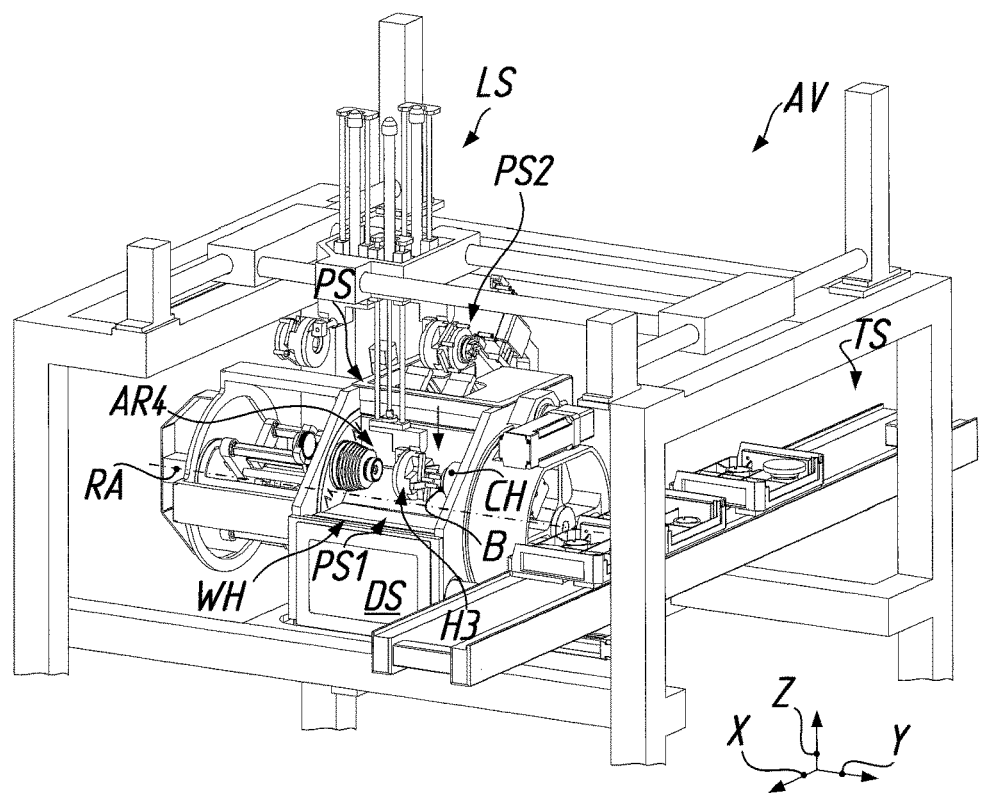

FIG. 25: The third holder H3 is moved in negative z direction into the lower end position, so that the third holder H3 is opposite the block piece B held in the workpiece holder CH of the fourth work space AR4.

Figure 26:
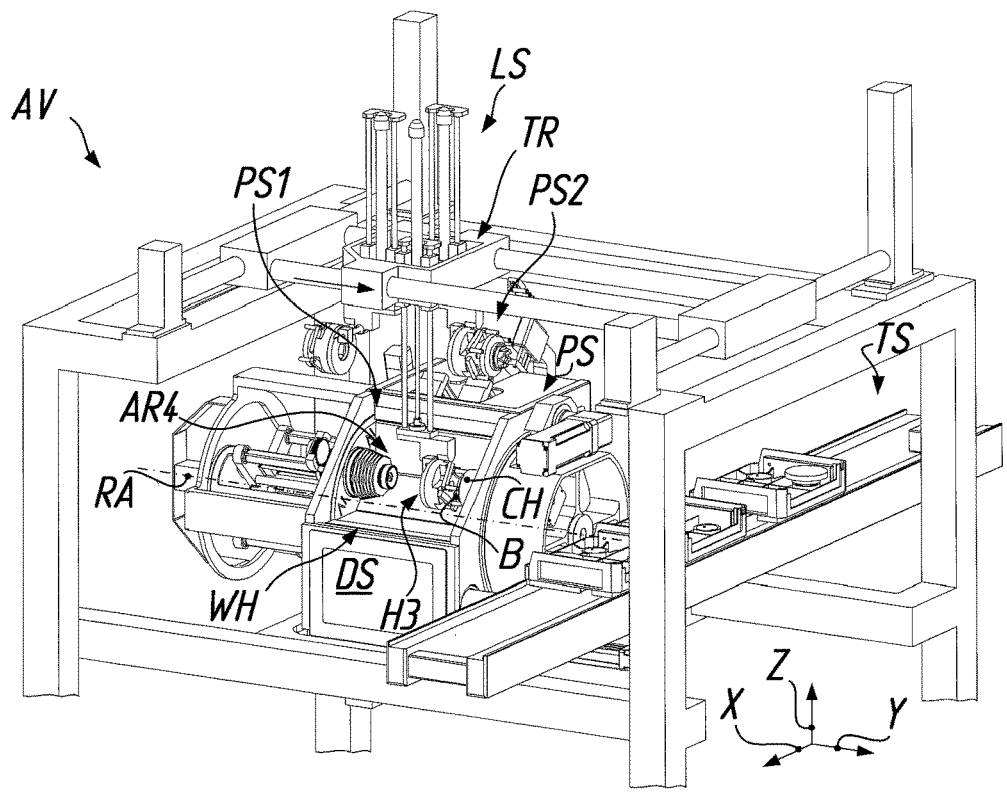

FIG. 26: The carrier TR is moved in positive y direction so that the third holder H3 can grip the block piece B in the workpiece holder CH of the fourth work space AR4.

Figure 27:
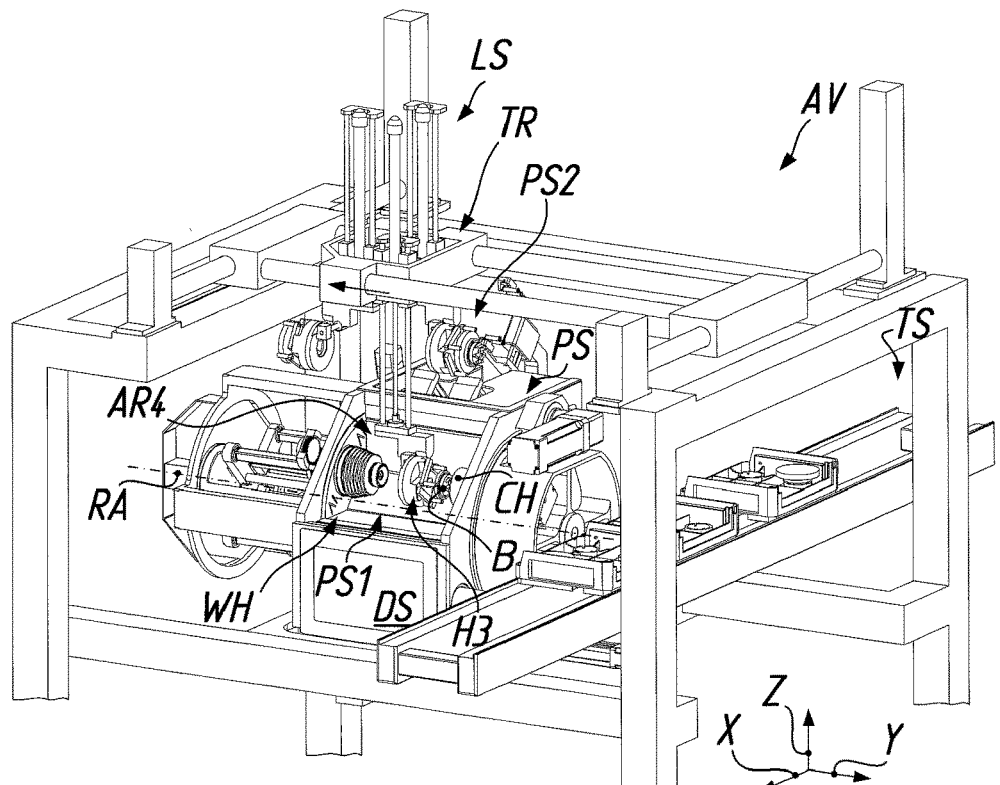

FIG. 27: The carrier TR is moved in negative y direction so that the third holder H3 draws the block piece B out of the workpiece holder CH of the fourth work space AR4.

Figure 28:
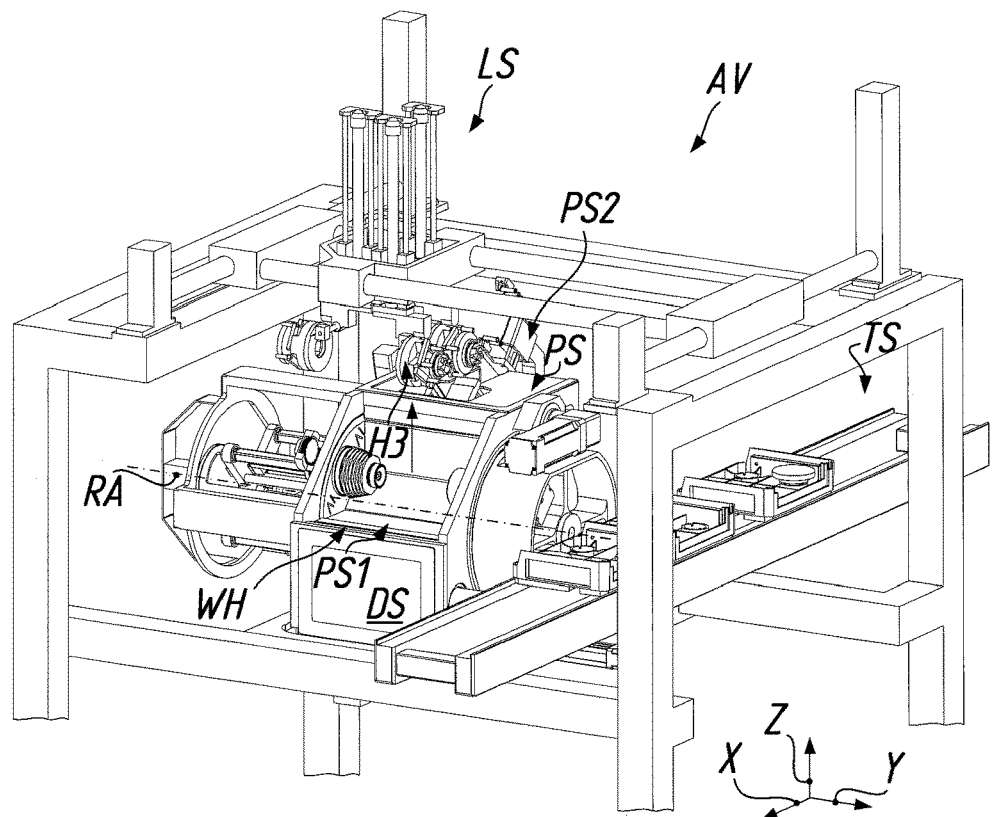

FIG. 28: The third holder H3 is moved in positive z direction into its upper end position.

Figure 29:
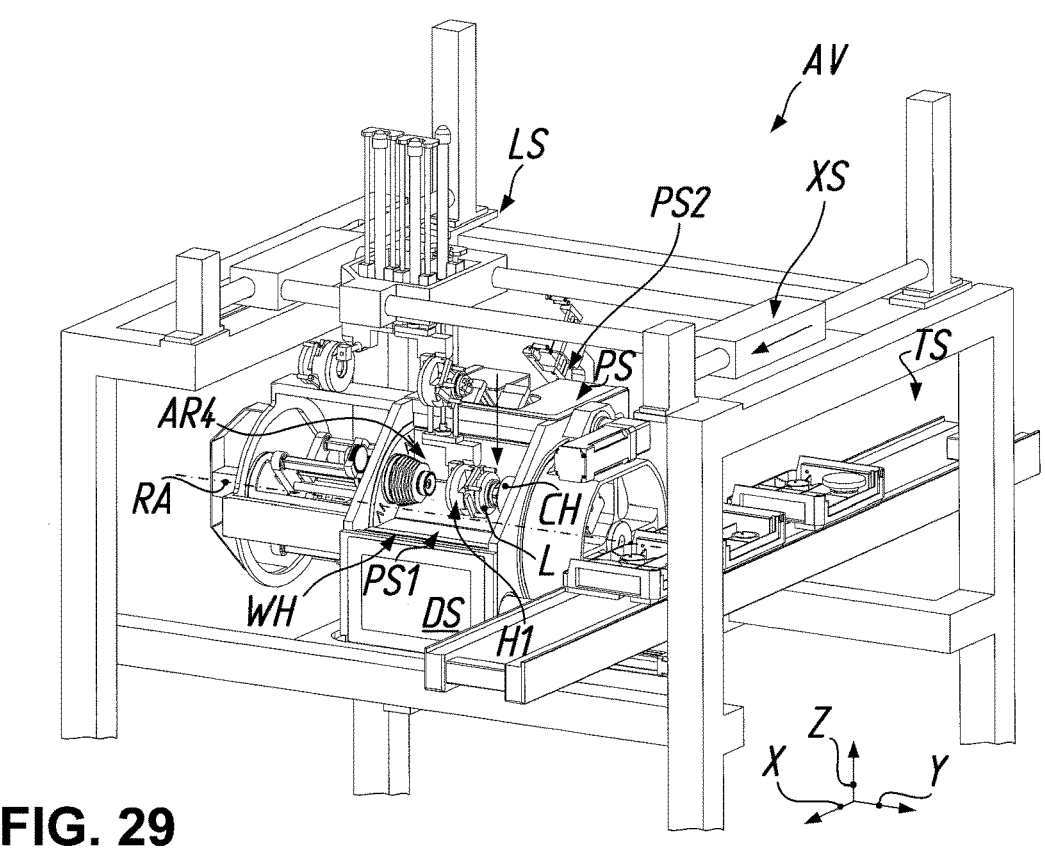

FIG. 29: The blocked spectacle lens L held by the first holder H1 is positioned opposite the workpiece holder CH of the fourth work space AR4 in the first sub-station PS1 of the loading station PS by the x carriage XS being moved in positive x direction and the first holder H1 in negative z direction into the lower end position thereof.

Figure 30:
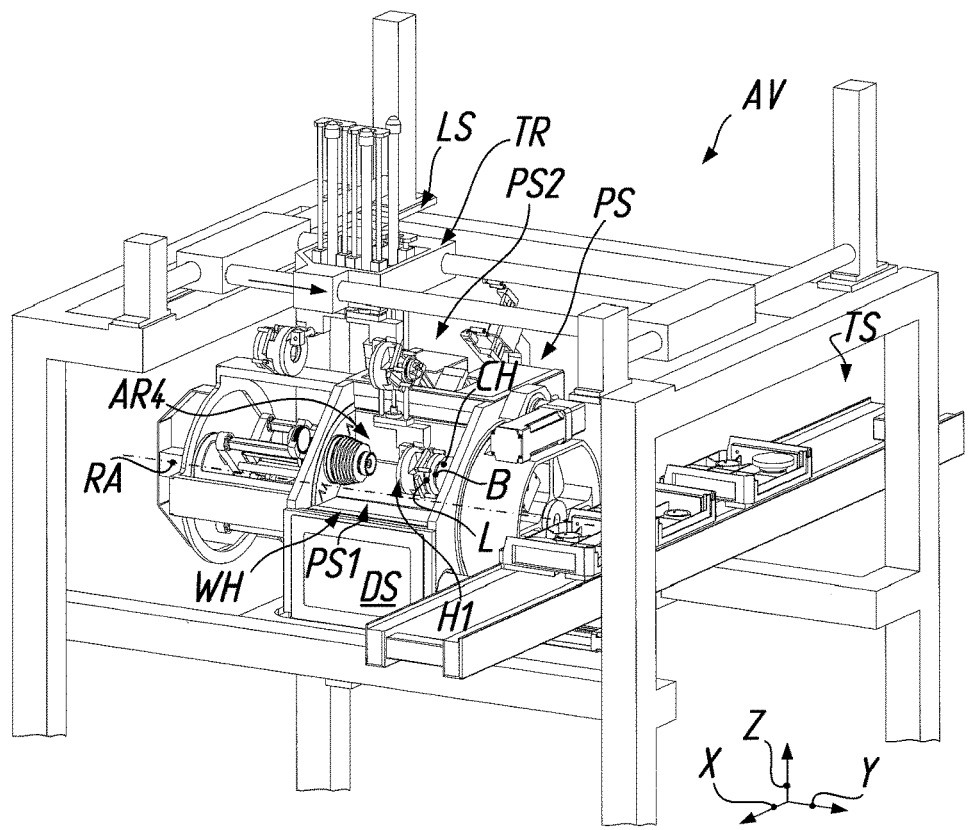

FIG. 30: The carrier TR is moved in positive y direction and the blocked spectacle lens L held at the first holder H1 is inserted by its block piece B into the workpiece holder CH of the fourth work space AR4.

Figure 31:
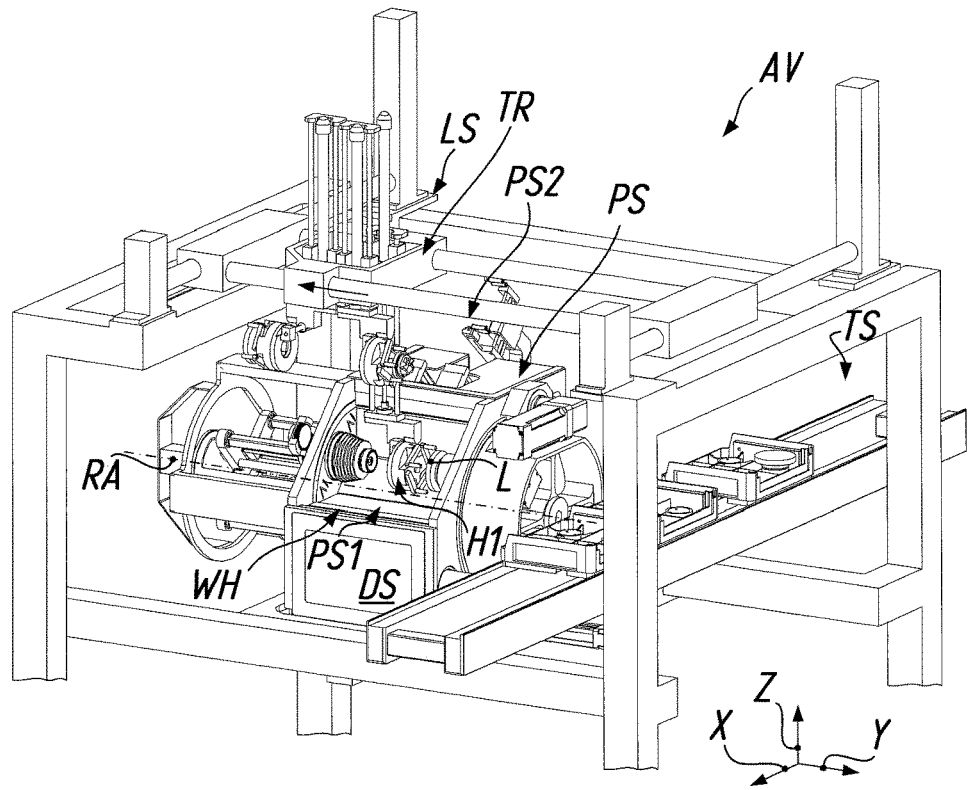

FIG. 31: The first holder H1 is opened for release of the blocked spectacle lens L and the carrier TR is moved in negative y direction.

Figure 32:
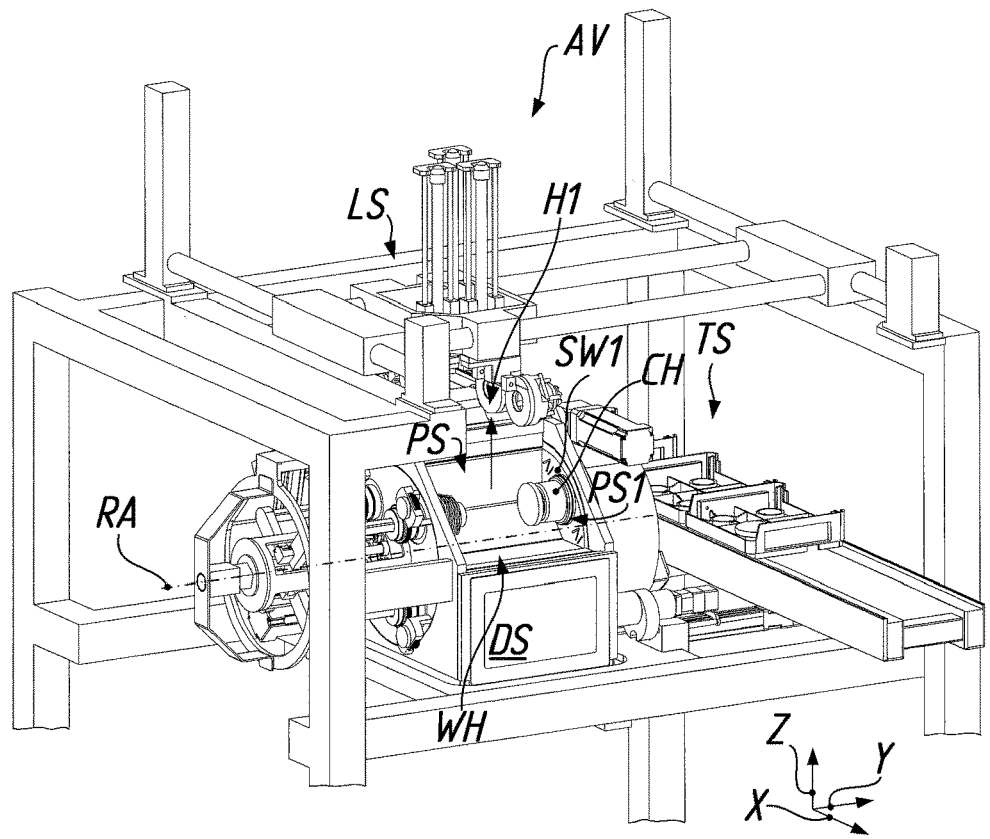

FIG. 32: The first holder H1 is moved in positive z direction into the upper end position.

Figure 33:
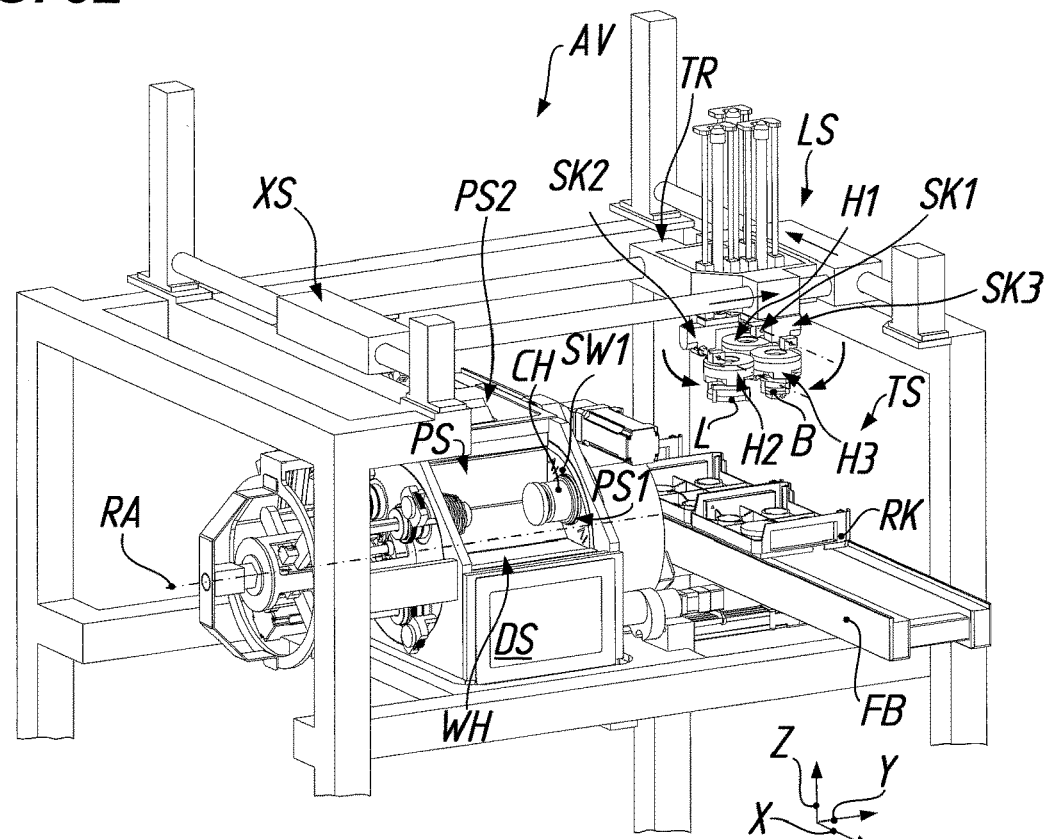

FIG. 33: The three holders H1, H2, H3 are pivoted by the respective pivot mechanism SK1, SK2, SK3 into the vertical position, wherein the x carriage XS and the carrier TR are so moved in positive y direction and negative x direction that the deblocked spectacle lens L at the second holder H2 and the block piece B at the third holder H3 are positioned above the job tray RK for deposit, which in x direction is present on the conveyor belt FB at the foremost position of the transfer station TS.

Figure 34:
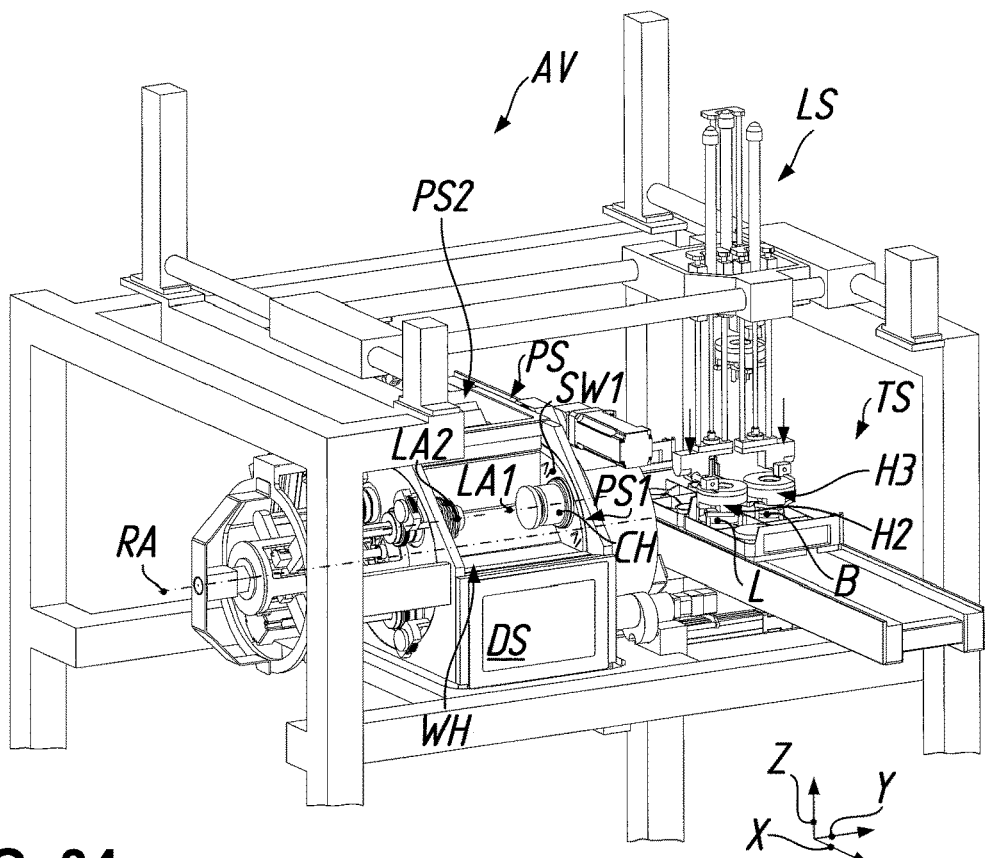

FIG. 34: The second holder H2 and the third holder H3 are moved, for deposit of the block piece B and the deblocked spectacle lens L, in negative z direction into the lower end position.

Figure 35:
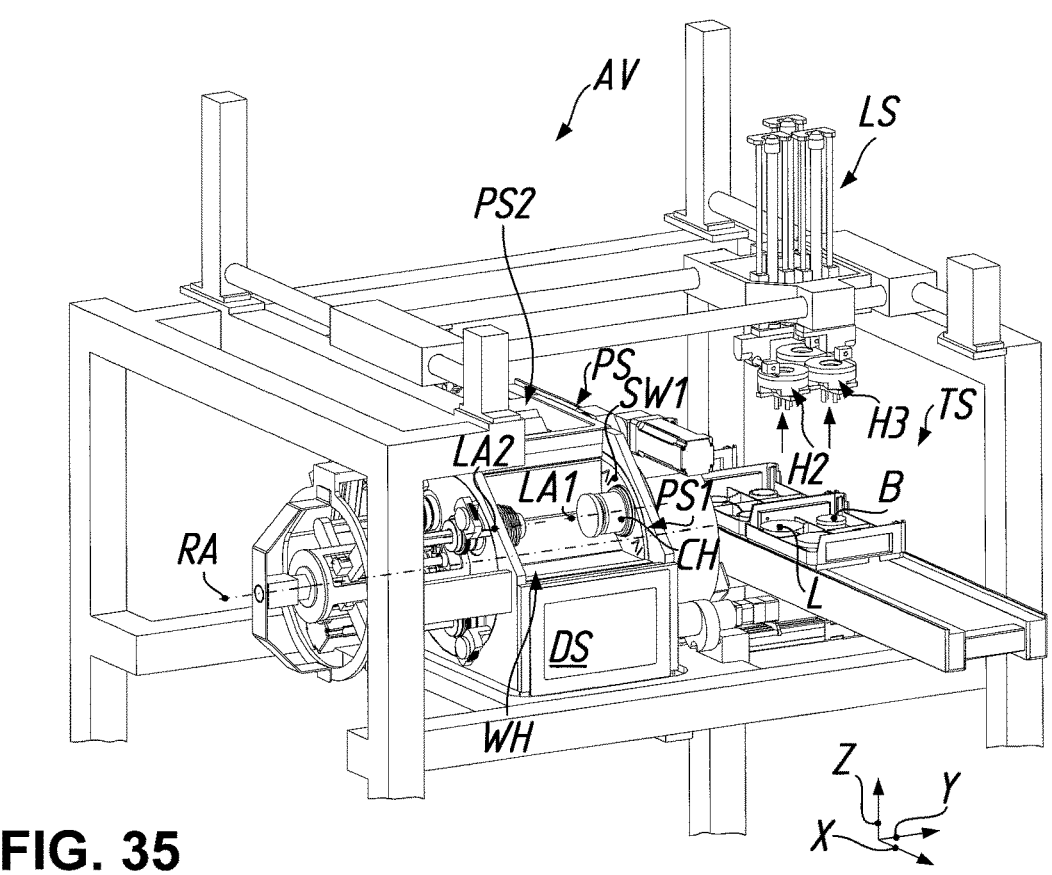

FIG. 35: After deposit of the block piece B and the deblocked spectacle lens L, the second holder H2 and the third holder H3 are moved in positive z direction into the upper end position, whereupon a new loading cycle and unloading cycle can begin.

By virtue of the high dynamic of the afore-described loading system LS it is possible to master even a comparatively high throughput of spectacle lenses L, which are deblocked in the deblocking device AV, of, for example, 250 spectacle lenses L per hour in terms of loading (loading and unloading) and this with a nevertheless very simple device, a greater degree of overview, good service-friendliness and high production serviceability.

A loading system for an optical machine, particularly for loading and unloading optical workpieces, such as spectacle lenses, and/or block pieces for blocking workpieces and/or tools, comprises a carrier which is movable in a movement plane by way of two linear guide units. At least one holder, which is movable in a transverse direction with respect to the movement plane, for the workpiece, block piece and/or tool is mounted on the carrier. The linear guide units are constructed and arranged in the manner of an H gantry or a cross gantry, with two stationary drive motors for drive in the same sense or opposite sense of a traction element which is movably arranged in an H shape or a cross shape at the linear guide units and is secured to the carrier. The loading system preferably finds use in a deblocking apparatus in order to transport blocked and also deblocked workpieces and block pieces with a very high dynamic between a transfer station and a loading station of the deblocking apparatus and to respectively receive or deliver them thereat.

Variations and modifications are possible without departing from the scope and spirit of the present invention as defined by the appended claims.

What is claimed is:

1. A loading system (LS) for an optical machine, having a carrier (TR), which is movable in a movement plane (x-y) by way of two linear guide units (LF1, LF2) and which carries at least one holder (H1, H2, H3) for an optical workpiece (L) and/or a block piece (B) and/or a tool, the holder being movable in a transverse direction (z) with respect to the movement plane (x-y), wherein the linear guide units (LF1, LF2) are constructed and arranged in the form of an H gantry or a cross gantry, with two stationary drive motors (AM1, AM2) for drive in the same or opposite sense of a traction element (ZG) which is movably arranged in an H shape or a cross shape at the linear guide units (LF1, LF2) and secured to the carrier (TR); and wherein one linear guide unit (LF1) comprises two stationary x guide elements (XF1, XF2), which extend parallel to one another and at each of which a respective x half-carriage (HS1, HS2) is guided to be longitudinally displaceable, while the other linear guide unit (LF2) comprises two y guide elements (YF1, YF2), which extend parallel to one another and transversely to the x guide elements (XF1, XF2) and rigidly connect the x half-carriages (HS1, HS2) together and at which the carrier (TR) as y carriage is guided to be longitudinally displaceable.

2. A loading system (LS) according to claim 1, wherein, when the linear guide units (LF1, LF2) are constructed and arranged in the form of an H gantry, two 180° deflections (UL1, UL2, UL3, UL4) for the traction element (ZG) are associated with each of the stationary x guide elements (XF1, XF2) and arranged at the ends, while each of the x half-carriages (HS1, HS2) carries two 90° deflections (UL5, UL6, UL7, UL8) for the traction element (ZG), and wherein one (UL1) of the 180° deflections (UL1, UL3) at one x guide element (XF1) is drivable by one (AM1) of the stationary drive motors (AM1, AM2) and independently thereof the other one (UL2) of the 180° deflections (UL2, UL4) at the other x guide element (XF2) is drivable by the other one (AM2) of the stationary drive motors (AM1, AM2).

3. A loading system (LS) according to claim 2, wherein one (UL4) of the 180° deflections (UL1, UL2, UL3, UL4) is provided with a tensioning device (SE) for the traction element (ZG).

4. A loading system (LS) according to claim 1, wherein the x guide elements (XF1, XF2) and/or the y guide elements (YF1, YF2) are guide rods.

5. A loading system (LS) according to claim 4, wherein each of the x half-carriages (HS1, HS2) is provided with two linear bearing elements (LL), which are axially spaced from one another and which co-operate with the guide rod respectively associated as x guide element (XF1, XF2).

6. A loading system (LS) according to claim 4, wherein the carrier (TR) constructed as y carriage comprises three linear bearing elements (LL), which are spaced from one another and of which two linear bearing elements (LL) co-operate with one y guide element (YF2) constructed as a guide rod, while the other linear bearing element (LL) co-operates with the other y guide element (YF1) constructed as a guide rod.

7. A loading system (LS) according to claim 6, wherein the traction element (ZG) is secured to the carrier (TR) at a securing point (BS) adjacent the two linear bearing elements (LL), which both co-operate with the one y guide element (YF2) constructed as a guide rod.

8. A loading system (LS) according to claim 1, wherein the y guide elements (YF1, YF2) are constructed as hollow bodies.

9. A loading system (LS) according to claim 1, wherein the x guide elements (XF1, XF2) and/or the y guide elements (YF1, YF2) are guide rods with a round cross-section.

10. A loading system (LS) according to claim 5, wherein the linear bearing elements (LL) are ball bushings with which strippers (AS) are associated at each of two longitudinal sides.

11. A loading system (LS) according to claim 1, wherein the traction element (ZG) is a belt.

12. A loading system (LS) according to claim 1, wherein the at least one holder (H1, H2, H3) is movable by an associated pneumatic cylinder (PZ1, PZ2, PZ3) in the transverse direction (z) with respect to the movement plane (x-y).

13. A loading system (LS) according to claim 1, wherein the at least one holder (H1, H2, H3) is in addition pivotable by an associated pneumatic pivot mechanism (SK1, SK2, SK3) from a position aligned with the transverse direction (z) to a position oriented substantially perpendicularly to the transverse direction (z), and conversely.

14. A loading system (LS) according to claim 1, wherein the at least one holder (H1, H2, H3) is a pneumatically actuable multi-finger gripper.

15. A loading system (LS) according to claim 1, wherein a valve terminal (VI) for activation of pneumatic components is arranged on the carrier (TR) constructed as y carriage.

16. A loading system (LS) according to claim 1, wherein the carrier (TR) as seen in plan view is of substantially O-shaped configuration with a central opening (OE) in which the at least one holder (H1, H2, H3) is mounted to be movable in the transverse direction (z) with respect to the movement plane (x-y).

17. An apparatus (AV) for deblocking optical workpieces (L), particularly spectacle lenses, from associated block pieces (B), comprising a transfer station (TS) for deposit of optical workpieces (L) blocked on block pieces (B) and/or deblocked optical workpieces (L) and/or block pieces (B), and a loading station (PS) for loading optical workpieces (L), which are blocked on block pieces (B), prior to deblocking and/or unloading deblocked optical workpieces (L) and/or block pieces (B) after deblocking, and further comprising a loading system (LS) according to claim 1, by which the optical workpieces (L) blocked on block pieces and/or the deblocked optical workpieces (L) and/or the block pieces (B) are transportable between the transfer station (TS) and the loading station (PS) and can be placed in or removed from the respective station (TS, PS) wherein the carrier (TR) of the loading system (LS) comprises three holders (H1, H2, H3), which are movable in the transverse direction (z) with respect to the movement plane (x-y) and of which a first holder (H1) is assigned to the optical workpieces (L) blocked on block pieces (B), a second holder (H2) is assigned to the deblocked optical workpieces (L) and a third holder (H3) is assigned to the block pieces (B).

18. An apparatus (AV) according to claim 17, wherein the transfer station (TS) comprises a conveyor belt (FB) for transport in a transport direction (R) of job trays (RK) serving for reception of optical workpieces (L) blocked on block pieces (B) and/or deblocked optical workpieces (L) and/or block pieces (B).

19. An apparatus (AV) according to claim 17, wherein the second holder (H2) for the deblocked optical workpieces (L) as seen transversely to the transport direction (R) of the conveyor belt (FB) lies adjacent to the third holder (H3) for the block pieces (B).

* * * * *